Sept. 15, 1931.  W. B. PAYNE  1,823,161
MACHINE FOR APPLYING CHARACTERS TO SHEETS OR FORMS
Filed Aug. 11, 1927  10 Sheets-Sheet 1
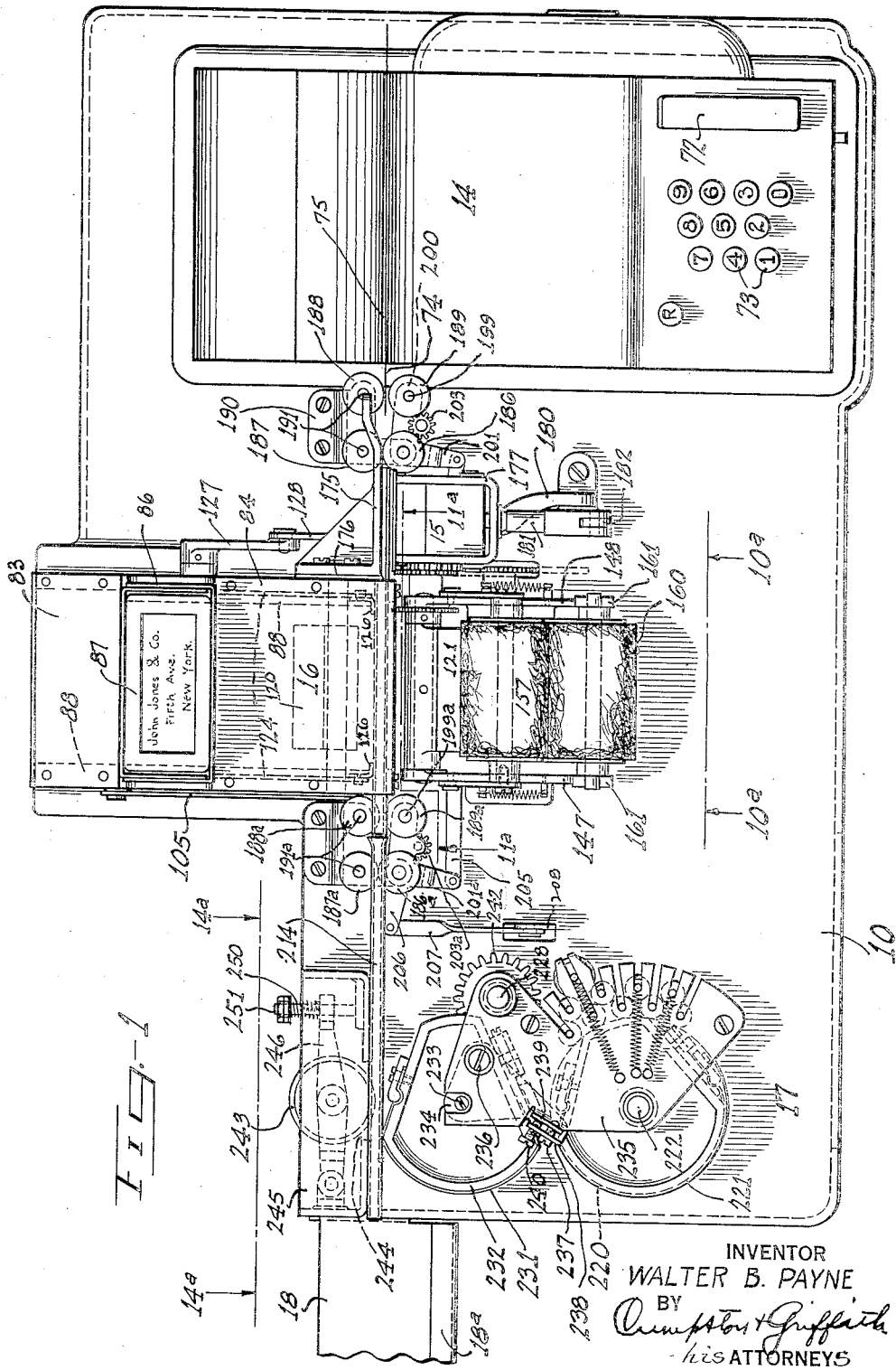
INVENTOR
WALTER B. PAYNE
BY
his ATTORNEYS

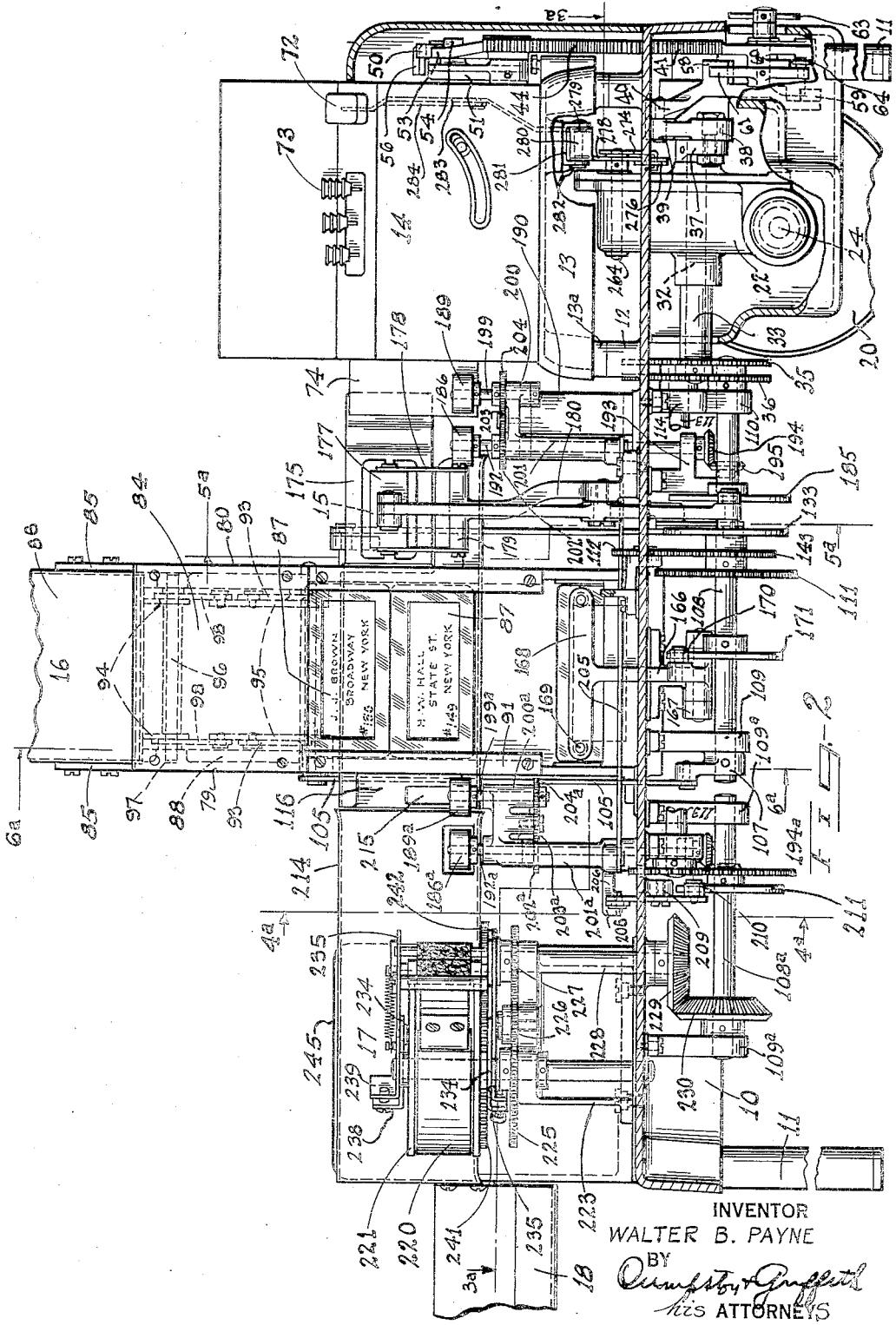

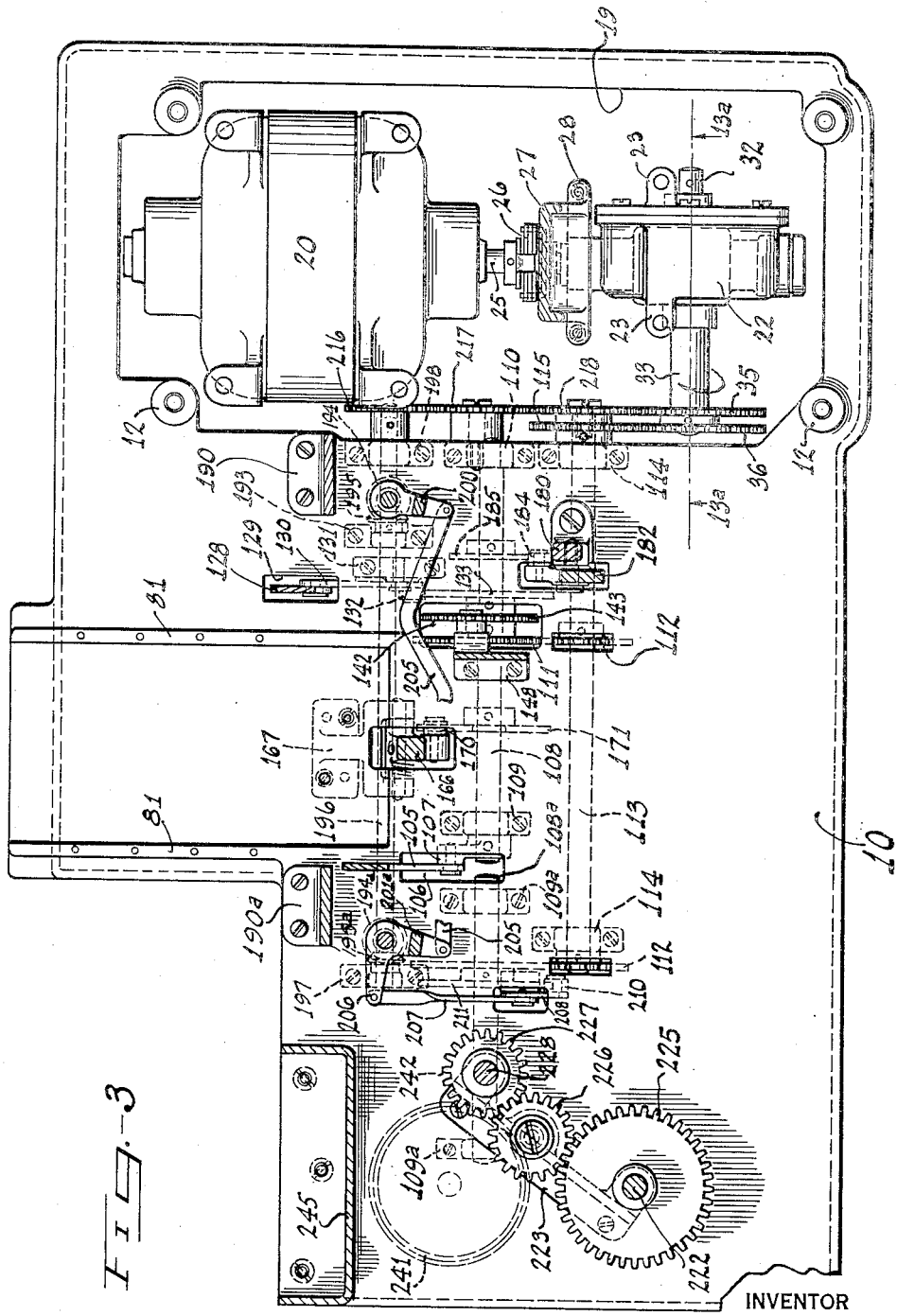

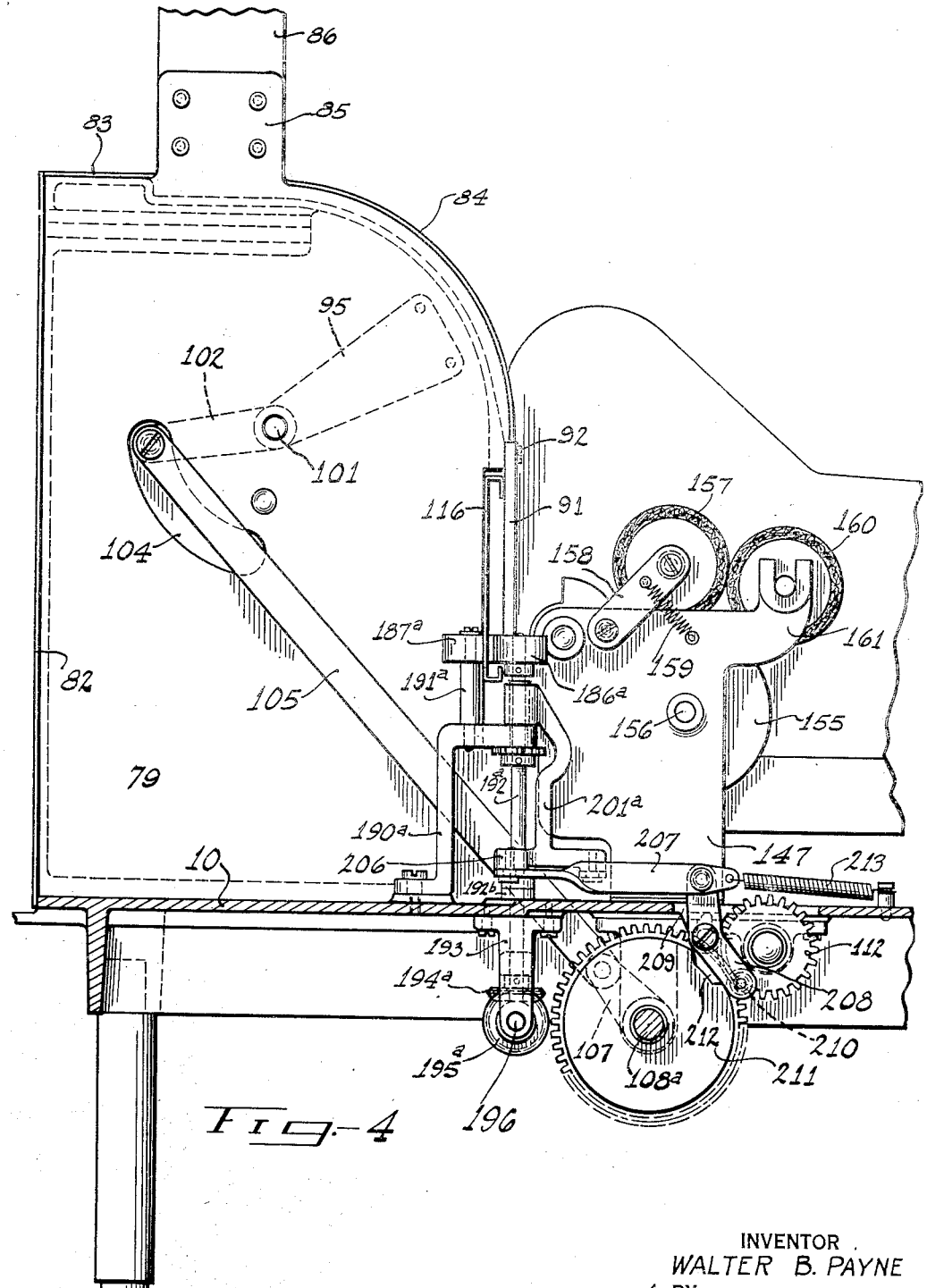

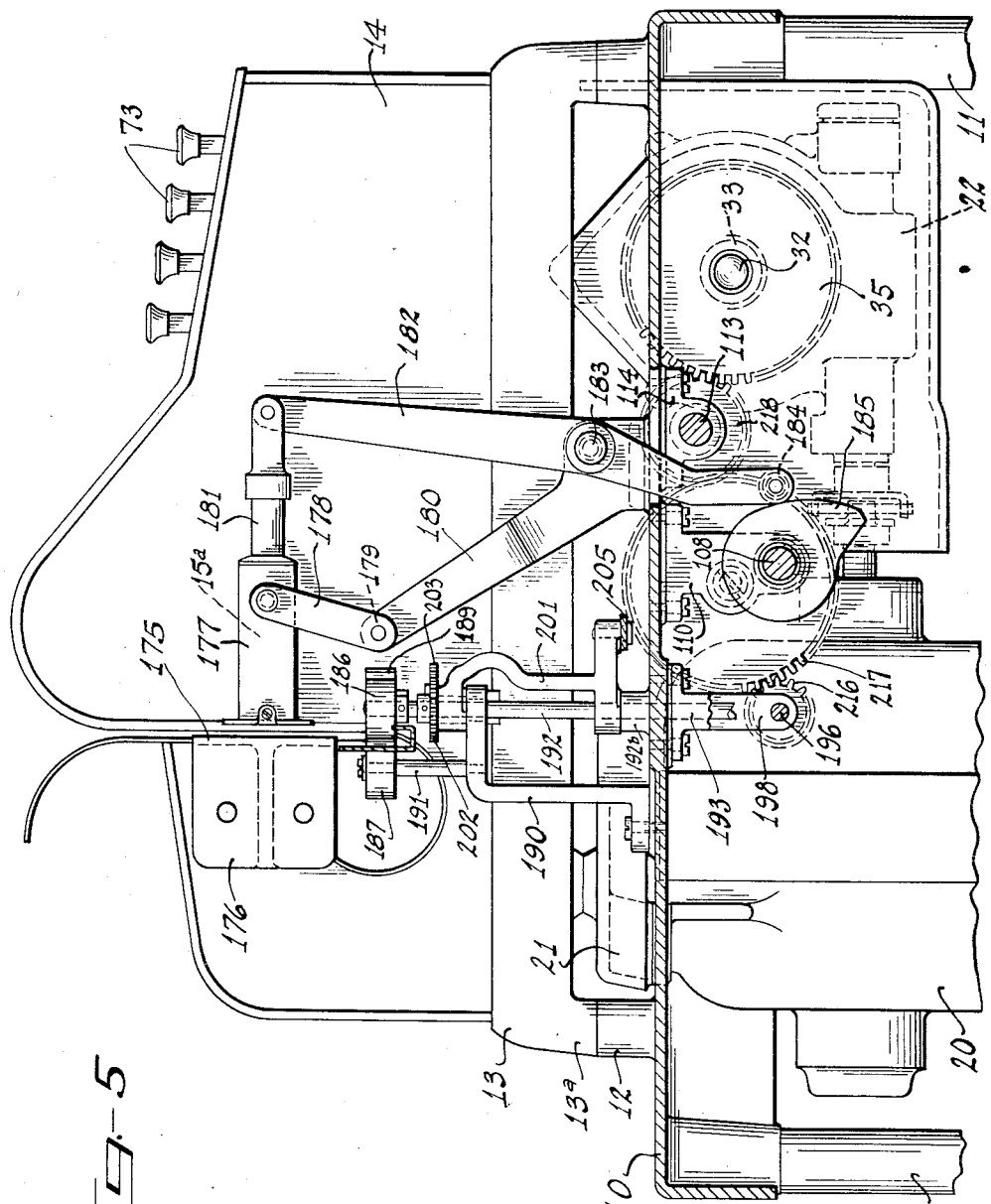

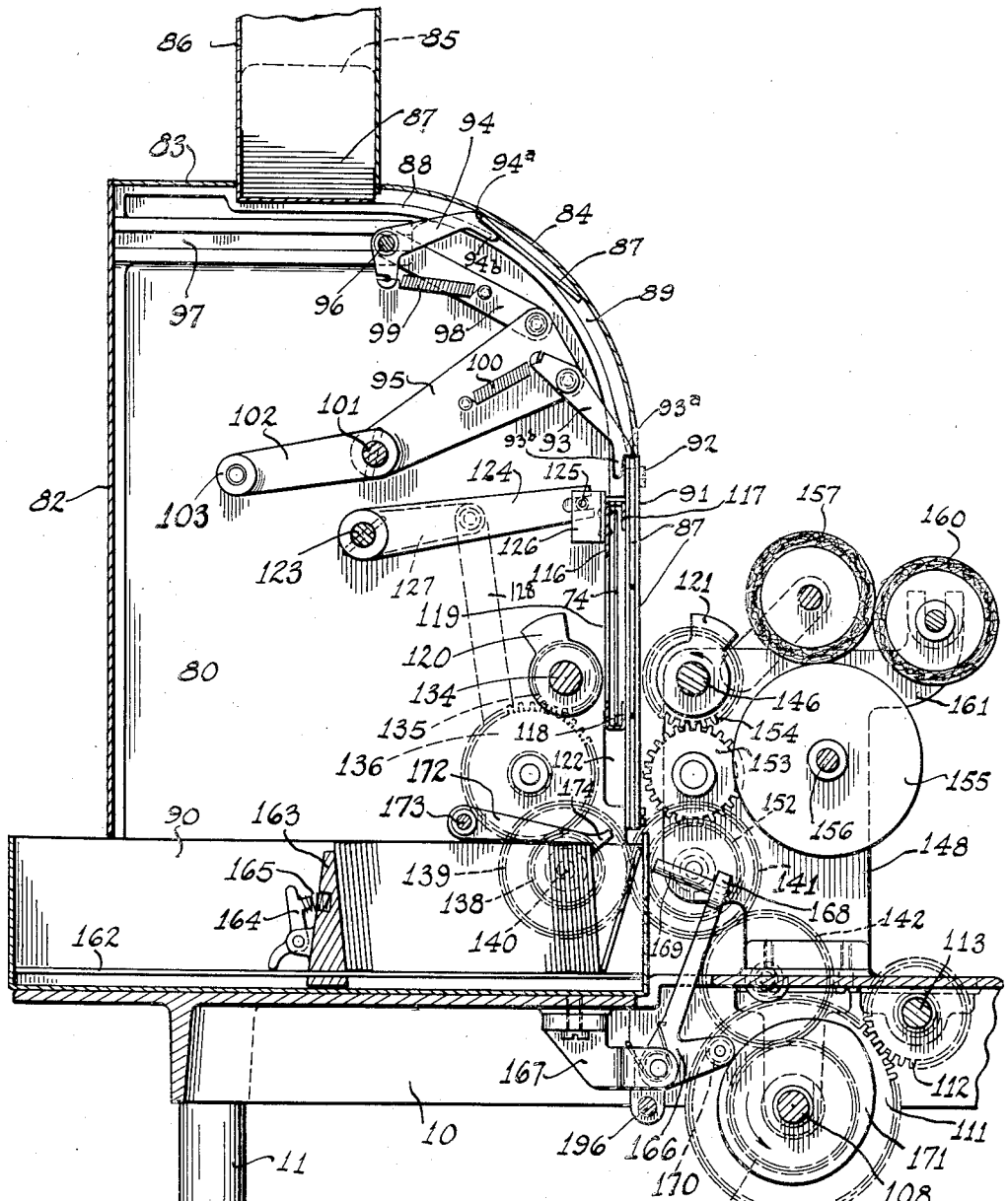

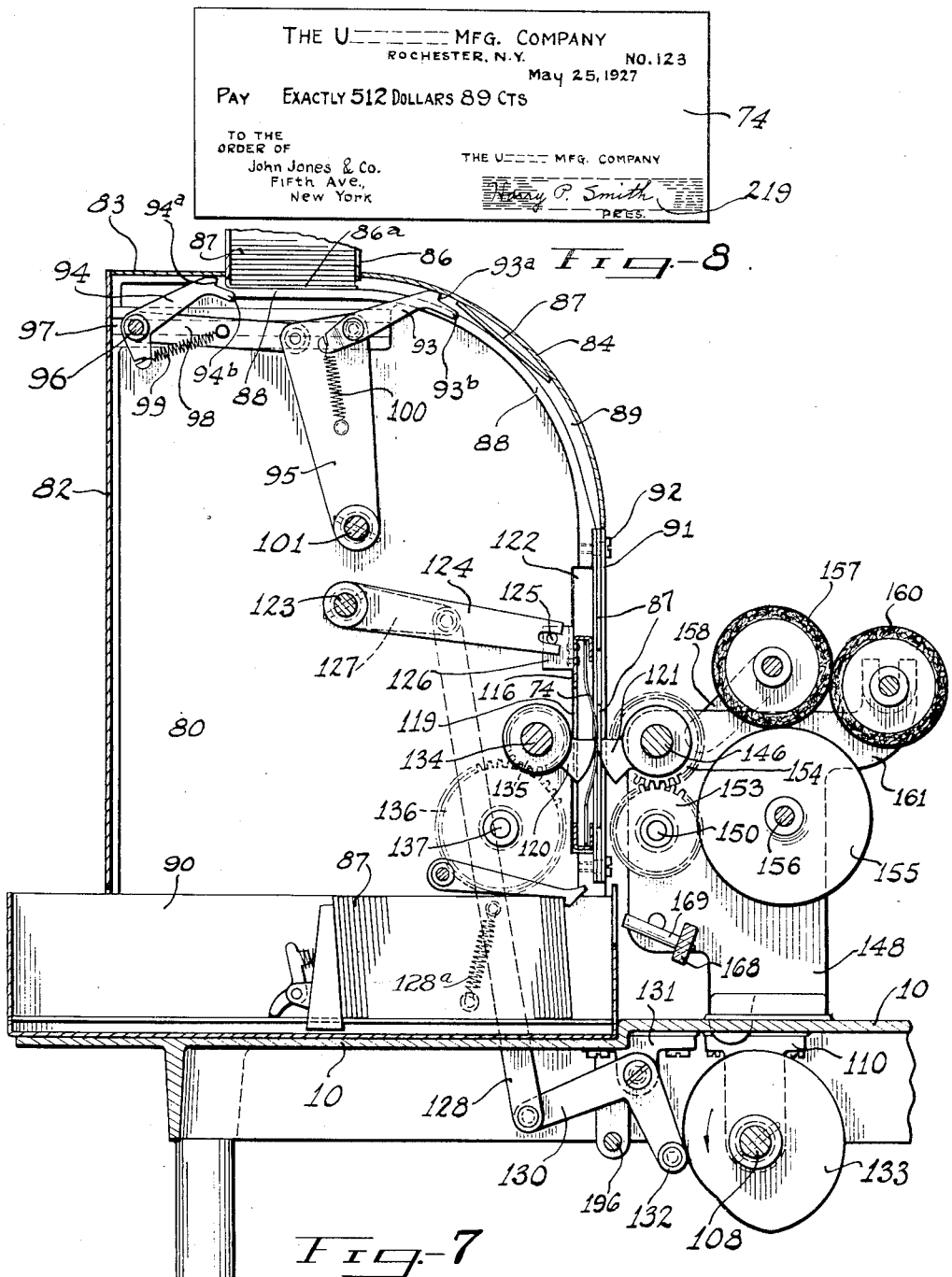

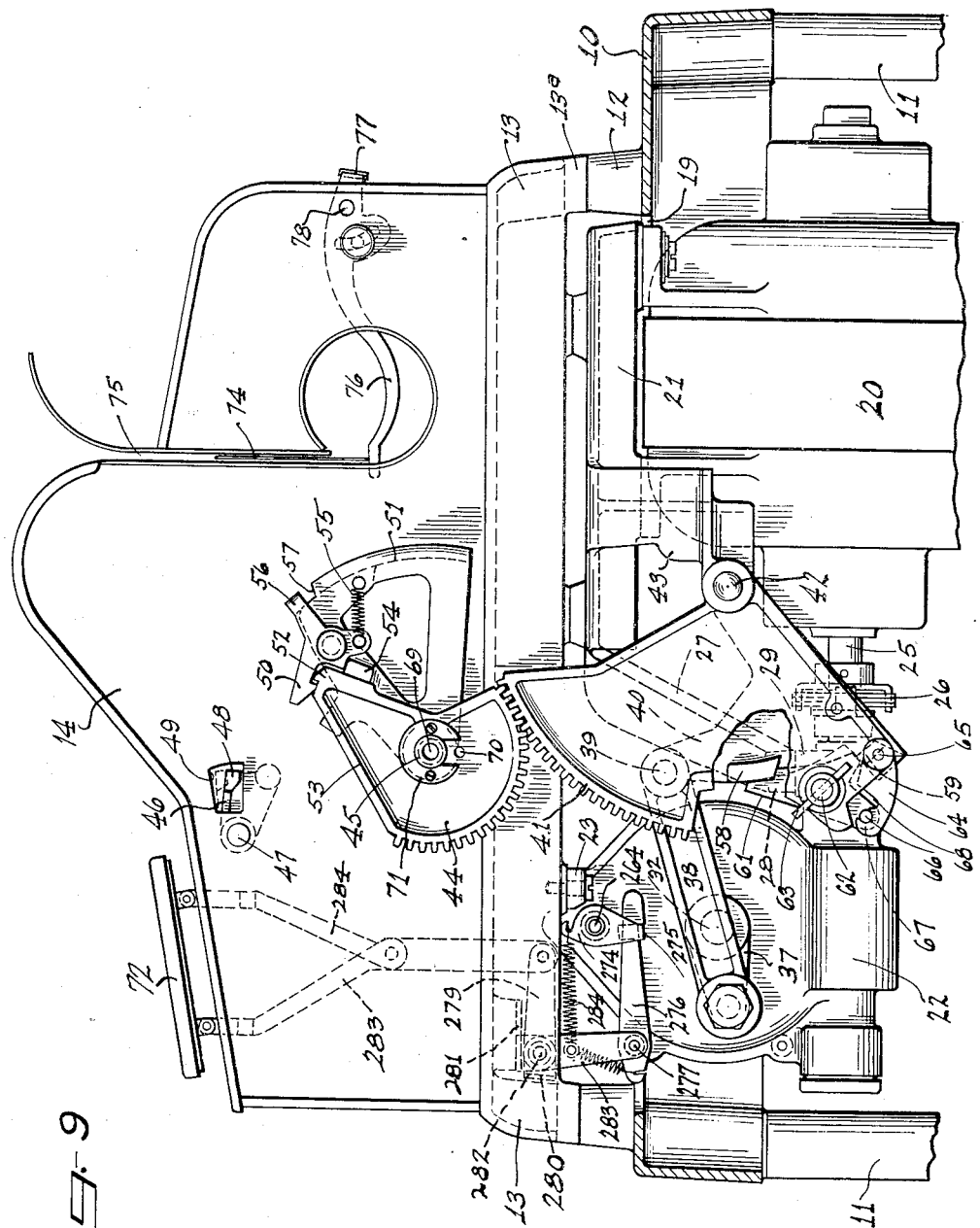

Sept. 15, 1931. W. B. PAYNE 1,823,161
MACHINE FOR APPLYING CHARACTERS TO SHEETS OR FORMS
Filed Aug. 11, 1927 10 Sheets-Sheet 9
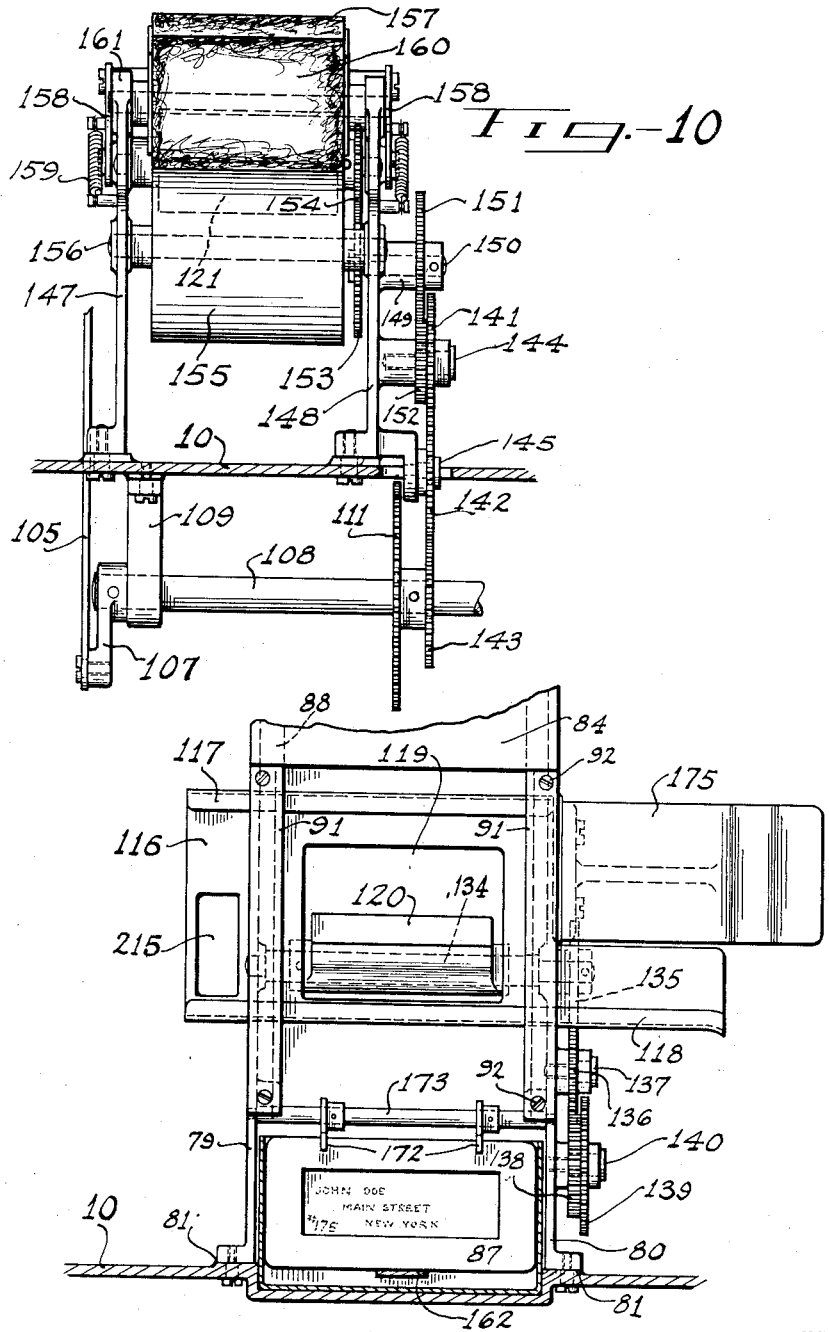
INVENTOR
WALTER B. PAYNE
BY
HIS ATTORNEYS

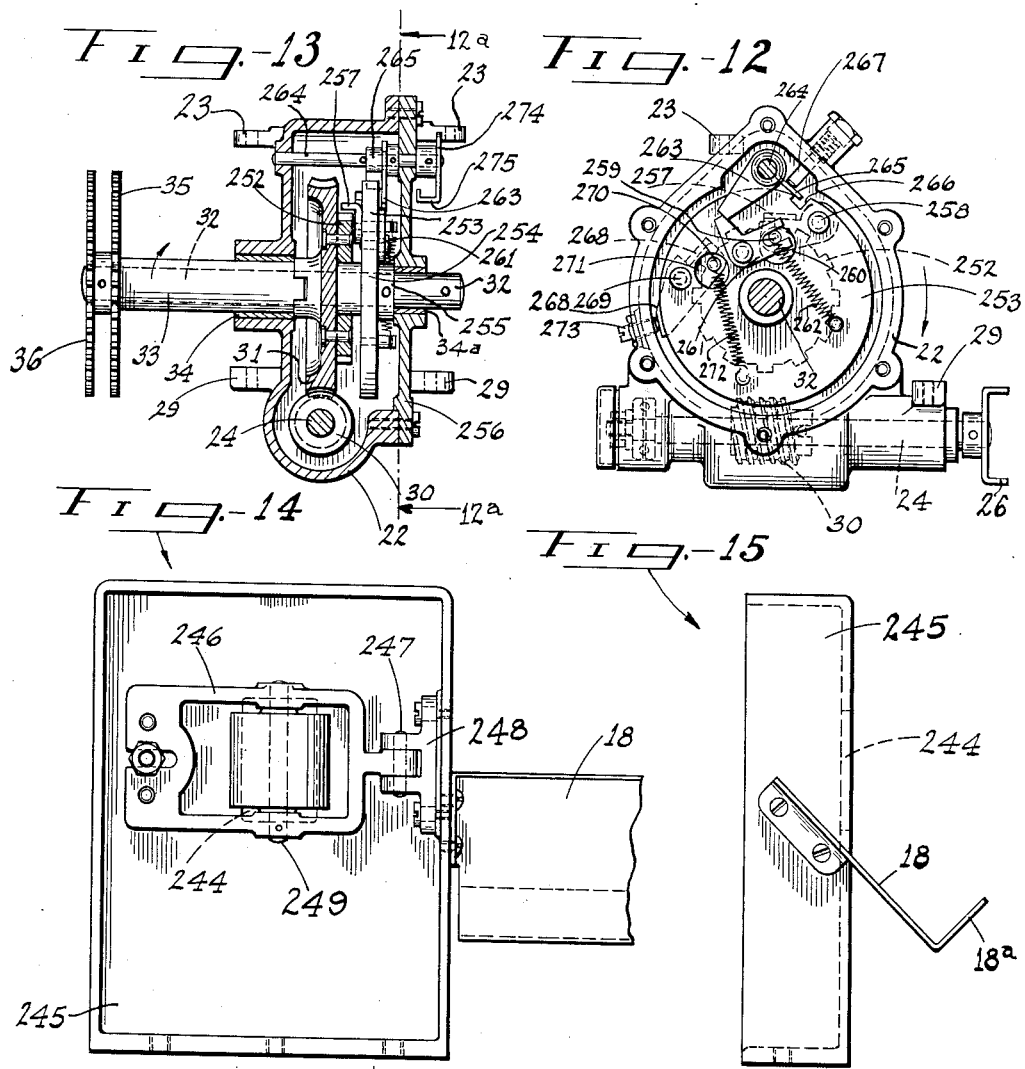

Patented Sept. 15, 1931

1,823,161

UNITED STATES PATENT OFFICE

WALTER B. PAYNE, OF ROCHESTER, NEW YORK, ASSIGNOR TO THE TODD COMPANY, OF ROCHESTER, NEW YORK, A CORPORATION OF NEW YORK

MACHINE FOR APPLYING CHARACTERS TO SHEETS OR FORMS

Application filed August 11, 1927. Serial No. 212,334.

The present invention relates to a machine for applying characters to sheets or forms and has for one object to provide an improved machine of this class in which the characters may be stamped, printed, stenciled or otherwise applied to the sheets at two or more stations by a plurality of timed and properly coordinated mechanisms arranged to operate on and to transfer the sheets or forms at regular intervals from one station to another, whereby when reaching their destination, the required characters or data will have been applied to the sheets at points previously determined upon.

A further object of the invention is to provide a machine of the class described in which relatively small sheets or forms, such for example, as checks, bank drafts, and other negotiable paper or various forms requiring the application of certain names, dates, numbers or other characters, can be turned out principally by the automatic operation of the machine under the control of one entrusted with the care and handling of the checks or forms.

A further object of the invention is to provide an improved machine embodying a series of printing or character applying devices driven by a common source of power and timed or coordinated with means for advancing the forms to be operated upon by said devices whereby mechanism is afforded for filling out checks, drafts, and the like, which is particularly adapted for use by banks, corporations, manufacturers and others making regular disbursements in the form of dividend or pay checks in relatively large numbers, the machine being so designed as to readily apply, under the control of an operator, the individual amounts to be paid, the dates of issue, the payees' names, and preferably the signatures of the officers or others issuing or making the checks.

A further object of the invention is to provide a machine of the class described in which certain characters intended for application to the various checks or forms are first presented to the operator by the machine successively and automatically at a given point as identifying means which will permit the operator to select, as from a list placed before him, another set of figures or characters intended for application to the check, whereby he may proceed to manipulate certain parts of the machine to effect application of the selected characters at the proper time.

A further object of the invention is to provide an improved machine for applying data to sheets embodying a combined character applying or printing mechanism, and a second character applying or stenciling mechanism adapted for automatically feeding indicating characters or stencils which serve to present identifying data to an operator whereby when the sheets are placed in the printing mechanism he is informed by said indicating characters of the particular set of characters to be selected and applied by said printing mechanism, said stencils subsequently operating through cooperation with other devices to mark the sheets with the identifying characters thereon after the sheets have been advanced from the printing mechanism.

A further object is to provide an improved clutch mechanism for controlling the operation of the machine.

A further object of the invention is to provide a compact machine of the class described which is efficient in service, convenient to operate, and which will greatly reduce the time and expense of turning out a given number of checks or forms of the kind described.

To these and other ends the invention resides in certain improvements and combinations of parts, all as will be hereinafter more fully described, the novel features being pointed out in the claims at the end of the specification.

In the drawings:

Figure 1 is a plan view of a machine embodying the invention;

Figure 2 is a front elevation of the same with certain parts broken away and others in section to better illustrate the various mechanisms;

Figure 3 is a sectional plan taken substantially on line 3a—3a of Figure 2;

Figure 4 is an enlarged transverse section taken on line 4a—4a of Figure 2;

Figure 5 is a transverse section taken on line 5a—5a of Figure 2;

Figure 6 is a transverse section taken on line 6a—6a of Figure 2, showing the check holder in normal raised position;

Figure 7 is a similar view with the check holder shown in lowered position, to position the check opposite the stencil;

Figure 8 is a face view of one of the completed checks or forms illustrating by way of example, certain data which may be applied by the present machine;

Figure 9 is an end elevation of the machine as viewed from the right of Figure 2, certain parts of the casing being removed to more clearly illustrate the drive for the check writer and other units of the machine;

Figure 10 is a fragmentary sectional elevation taken on line 10a—10a of Figure 1, showing a portion of the means for supplying ink to the stencils;

Figure 11 is a fragmentary sectional elevation taken on line 11a—11a of Figure 1;

Figure 12 is a sectional elevation of a clutch mechanism taken on line 12a—12a of Figure 13;

Figure 13 is a transverse section through the clutch taken on line 13a—13a of Figure 3;

Figure 14 is a side elevation of a pressure roll and its support forming a part of the check signing mechanism, the same being shown in plan in the upper left hand corner of Figure 1;

Figure 15 is an end elevation of the bracket shown in Figure 14 as viewed from the right of the latter, and Figure 16 is a timing diagram illustrating the relative movements or positions of various operating parts of the machine.

Similar reference numerals throughout the several views indicate the same parts.

The present invention embodies, generally, a machine having a series of printing or character applying mechanisms, one of which is arranged to receive the check or form to be operated upon at one station where a certain set of figures or characters, preferably from a previously prepared list, are to be applied to the check which must correspond with other characters which are to be subsequently applied thereto, and which are automatically and successively presented to the operator by another mechanism as identifying means, which will enable him to successively select the proper data and effect its application to the individual checks or forms when positioned in the first of said character applying mechanisms. For example, in the printing or preparing of checks and other negotiable paper, a series of stencils bearing the names of the payees or other identifying marks are successively presented by a suitable mechanism at a given point in view of the operator, who, upon viewing the same, determines, preferably from a list before him, the amounts due the different individuals so that he may operate the proper keys of the check writing mechanism to successively apply the required amounts. Immediately following the printing or applying of the required amounts upon the successively presented checks, the latter are automatically advanced to the second station where, through a properly timed mechanism, the stencils bearing the payees' names are presented in proper order, following which suitable inking and pressure rolls operate to press the stencil and check together to apply the name in the desired position upon the check. Preferably while the checks are at the last named station, a dating stamp or other suitable marking device is automatically operated to apply the proper dates to the checks. The checks are then advanced to a third station where facsimiles of the maker's signatures are applied by a suitably timed mechanism which operates preferably while the signatures are being applied to feed the checks to a suitable holder or receiver from which they are removed for subsequent distribution.

Referring to the drawings, 10 represents a base having supporting legs 11, the base having at one end, upstanding lugs 12 for receiving the feet 13a on the base 13 of the character applying mechanism indicated generally at 14, such for example as the check writing mechanism disclosed in my copending application filed May 19, 1926 and bearing Serial No. 110,300.

Disposed upon the base at the left side of the check writer is a dating stamp indicated, generally at 15, while adjacent thereto is a stenciling mechanism indicated generally at 16 in Figure 1.

At the left of the stenciling mechanism the base carries a printing or character applying mechanism indicated generally at 17 in Figures 1 and 2, which comprises in the present instance a check signing mechanism corresponding substantially to that disclosed in a joint pending application, filed by Charles G. Tiefel and myself, October 18, 1926, and bearing Serial No. 142,194, the same being designed for placing facsimiles of the maker's signatures on the checks.

A holder 18 of any suitable design is provided for receiving the completed checks discharged by the check signing mechanism 17.

The base 10 is provided beneath the check writing mechanism with an opening 19 for the reception of parts of the driving means for operating the different character applying instrumentalities, including an electric motor 20 suspended preferably from a detachable sub-base 21, suitably connected with the check writer base 13, as best shown in Figure 9.

A clutch housing 22 is placed at one end of the motor and projects through an opening 19 in the base 10, the housing being provided with spaced lugs 23, Figures 3 and 9, which are suitably secured preferably by screws or bolts to the bottom of the check writer base 13. A worm shaft 24 has its opposite ends suitably journaled in the housing 22, and is preferably aligned with the motor shaft 25, with which it is coupled by a flexible connection indicated generally at 26 in Figure 9. The clutch housing is also supported by a bracket or arm 27 inclined downwardly from the sub-base 21, Figure 9, and having its lower end provided with laterally extended portions 28 connected with a pair of lugs 29 on the rear end of the housing 22 as shown in Figure 3. The shaft 24 carries a worm wheel 30 meshing with a worm gear 31 loose on a transverse shaft 32, Figures 12 and 13. The shaft 32 extends through sleeve 33 which is journaled in a bearing 34 at one side of the housing, the outer end of the shaft being journaled in a bearing 34a at the opposite side of the housing. The sleeve is constantly driven by the worm wheel through interlocking engagement therewith of the hub of the latter as shown in Figure 13. A gear 35 is mounted on and constantly driven by the sleeve, the gear being adapted for driving the check or sheet advancing means as will appear hereinafter. The shaft 32 has fixed on its inner end a gear 36 for intermittently driving certain parts of the machine as described hereinafter.

The driven parts of the character applying unit or check writer 14 are actuated intermittently by a crank or arm 37 rigid on shaft 32, said arm being pivotally connected with a link 38, Figure 9, which in turn is pivoted at 39 to a triangular shaped actuator 40 for oscillating the gear segment 41. The gear segment and actuator have a common pivotal support 42 carried by a bracket 43 depending from the sub-base 21 to which the motor 20 is connected as shown in Figure 9.

Segment 41 is adapted to operate another segment 44 located on the main drive shaft 45 of the present check writer, said shaft corresponding to and operating to drive the same mechanism as the main drive shaft 90 of the check writer mechanism disclosed in my copending application referred to above bearing Serial No. 110,300, filed May 19, 1926.

With the check writer shown in the present application and in the one referred to above, it is of course undesirable to effect a printing operation when the characters on the dial wheels (not shown) are out of perfect alignment. The mechanism for preventing such operation in the present machine is preferably the same as that of the machine disclosed in application Serial No. 110,300 referred to above. This mechanism is only disclosed in part in the present application and embodies a locking dog 46 hinged on a rod 47 corresponding to the rod 168 in said application. The locking dog has a lateral extension 48 which projects through an opening 49 in the outer side wall of the casing as shown in Figure 9. A pawl 50 is pivoted on an arm 51 rigidly connected with the main drive shaft 45 and normally engages an abutment 52 on an extension 53 of the segment 44, whereby the latter is coupled with the arm and held in engagement with a lug 54 on said arm through pressure exerted on the pawl by a spring 55. When the characters on the dial wheels are not in proper alignment, the extension 48 of the locking dog will be in lowered position and will lie in the path of the pawl 50 whereby when the segment 44 is swung to the left from the position shown in Figure 9, it will be automatically released by the raising of the pawl through engagement of its inclined face with the extension 48 of the locking dog 46. In this case, the motor would continue to operate segments 41 and 44 without operating the check writer 14, whereby rupture of the parts is avoided as will now be explained. The pawl 50 is provided with a finger 56 having an inwardly extending portion adapted to engage a shoulder 57 on the arm 51 to limit the swing of the pawl when it is moved to release position through engagement with the extension 48. The segment 44 after being released can be readily coupled with the arm 51 by snapping it into engagement with the spring pressed pawl so that it will again occupy the position shown in Figure 9. It will be understood of course, that normally the extension 48 will be in the raised position shown by dotted lines in Figure 9, and therefore out of the path of the pawl 56 and that it will be in lowered position only when the printing characters on the dial wheels mentioned above fail to become perfectly aligned.

Means is provided for disconnecting the actuator 40 from operative engagement with the segment 41 whenever it is desired to stop the motor and operate the check writer manually as a separate unit and independently of the rest of the mechanism. For this purpose the actuator carries on its outer face upper and lower lugs 58 and 59 respectively and the segment 41 has an inwardly projecting boss 60 on the face of which is seated a dog 61 which is rigid on a pin 62 journaled in the boss and having an outwardly projecting head provided with a handle portion 63 by which to swing the dog from engagement with the lugs 58 and 59 when it is desired to disconnect the actuator 40 from the gear segment 41. This is done by turning the pin 62 in a counter clockwise direction as viewed in Figure 9, whereby the ends of the dog 61 are swung so as to clear both lugs 58 and 59. However, a spring pressed latch 64 which is pivoted at 65 on the inner face of the gear segment has an outer notch for receiving a pin 66 on a downwardly projecting portion 67 of the dog 61, Figure 9, whereby the dog is normally held in engagement with the lugs 58 and 59 to cause the actuator to effect operation of the segment. When, however, the dog is moved to release position, the pin 66 takes into a second notch 68 of the latch 64, so that the latter yieldably holds the dog in release position. In this position the dog will clear the lugs 58 and 59 on the actuator when the segment 41 is oscillated through manual operation of the segment 44, it being understood that the clutch shown in Figures 12 and 13 is so designed as to always stop the shaft 32 and parts operated thereby in the position shown in Figure 9. With the actuator 40 and gear segment 41 disconnected, the latter, during manual operation of the segment 44, will be free to oscillate back and forth on its pivot independently of the actuator which, of course, will remain idle when operation of the motor is discontinued.

Manual operation of the check writer is preferably effected by a crank handle (not shown) having two projecting studs, one of which is adapted to take into a bore 69 in the end of the shaft 45, and the other into a hole 70 in the gear segment 44. The shaft 45 is provided on its outer end with an annular groove adapted to receive a retaining member 71 for holding the segment against endwise movement, the retaining member being slotted to permit it to be inserted upon the shaft and within the groove by a movement transverse to the axis of the shaft. The retaining member is suitably attached to the segment preferably by screws as shown in Figure 9.

The clutch, which will be more fully described hereinafter is so constructed as to permit the shaft 32 to be coupled with the worm wheel 31 upon depression of an operating bar or member 72 above the check writer casing, after the proper amounts of the individual checks have been set up by manipulation of the keys 73 in the manner described in my copending application Serial No. 110,300 referred to above. It will be understod that following depression of the bar, operation of the shaft 32 will actuate not only the main shaft 45 of the check writer, but the gear 36, which as described hereinafter, will operate the stenciling and check signing mechanisms, while the check feeding or advancing mechanism is being operated by the gear 35 in proper timed relation to advance the checks from the check writer to the stenciling mechanism, and from the latter to the check signing mechanism.

The check indicated at 74 is placed in the slot 75 of the check writer as shown in Figures 1 and 9, where it is in position to have the amount printed thereon, following the setting up operation and depression of the clutch controlling member 72. In this position the check may be supported by any suitable means such for example as a pair of adjustable arms 76 extended along the sides of the check writer casing and connected at the rear end thereof by a cross bar 77, whereby to form a rocking bail pivotally supported preferably by a rod 78 extending through the rear of the casing. The bail may, if desired, have additional arms for supporting the check (not shown), which may extend through slots in the casing as disclosed in my copending application No. 110,300 referred to above, and is preferably supported for adjustment to raised and lowered position in the same manner and by the same means as disclosed in said application.

The frame or casing for supporting the stenciling mechanism is superposed on the base 10 and embodies a pair of side plates 79 and 80 preferably in the form of castings, which are flanged at their lower edges, the flanges resting upon slightly raised portions 81 of the base, Figure 3, to which the flanges are suitably bolted as indicated in Figure 11. The side plates are connected by a back plate 82 and a cover plate 83 connects the side plates at their upper ends at the rear of the casing. The upper front edges of the plates 79 and 80 are curved as best shown in Figures 6 and 7 for a purpose which will presently appear. This portion of the casing is closed by a correspondingly curved plate 84, which extends downwardly in front of the machine to a point at which the casing is left open to render the stencils visible, as indicated in Figure 2, so that the operator may observe the names of the payees carried by the stencils for the purpose stated above. The side plates 79 and 80 are provided with extensions 85 at their upper ends adapted for receiving a vertically disposed container or chute 86 in which the stencils, indicated generally at 87 are stacked, as shown in Figures 6 and 7. The bottom of the container projects slightly below the cover plates 83 and 84 and is adapted to rest on ribs 88 preferably cast integral with and projecting inwardly from the side plates 79 and 80, Figures 1 and 2. The ribs are curved to correspond substantially to the curvature of the plate 84, Figures 6 and 7, whereby to form guideways 89 in the opposite sides of the casing for receiving the ends of the stencils during a portion of their travel from the horizontal position shown at the bottom of the container to the vertical position shown in a receiving drawer or receptacle 90 removably disposed in the bottom of the casing, Figure 6. Between the bottom of the guideways 89 and the receptacle 90 the stencils are guided by two vertically disposed holders 91, Figure 6, suitably secured to the front edges of the plates 79 and 80 preferably by screws 92 as indicated in Figure 11. The holders are provided with grooves of a width substantially equal to the thickness of the stencils whereby to form guideways for the latter, which are open at their ends and which terminate slightly above the receptacle 90 into which the stencils are discharged, preferably through downward pressure exerted thereon by the overlying stencils in said grooves. It will be understood that the stencils which have their ends disposed within the grooves will be held therein at the different positions to which they are moved through frictional engagement with the walls forming the grooves and will not therefore drop by gravity into the receptacle 90 except when pushed from the guideways or grooves by the stencils moved downwardly thereon. The guideways 89 being curved as shown, are made slightly wider than the guideways in the holders 91 so as to permit the stencils to be fed downwardly in a curved path without breaking and without bending the same to any considerable degree. It will be seen from Figures 6 and 7 that the stencils within the guideways 89 have the middle portions in engagement with the ribs 88 and their edge portions in engagement with the plate 84, so that they are frictionally held within the guideways 89 when not being advanced by the feed mechanism.

The means for feeding the stencils from the bottom of the container 86 downwardly and around the curved path or guideways 89 includes a pair of front levers 93 and a pair of rear levers 94, the former being pivoted on oscillatory arms 95 and the latter on a transverse shaft 96 having its ends disposed in guideways 97 formed on the inner faces of the side plates 79 and 80 as shown in Figure 6. The shaft 96 is connected with and actuated by the arms 95 through the medium of a pair of links 98. The levers 94 have their forward ends held in engagement with the upper wall of the casing by springs 99 which are connected with the links as shown in Figures 6 and 7 while the levers 93 have their forward ends held in engagement with said wall by springs 100 which are suitably connected with the arms 95. The arms 95 are supported by a rock shaft 101 having its opposite ends journalled in the side plates 79 and 80. The shaft carries on its left hand end a bell crank 102, the angular portion 103 of which projects through an arcuate slot 104 in the side plate 79, Figure 4 and is pivotally connected with a link 105 extending diagonally downward through a slot 106 in the base 10, Figure 3.

The lower end of the link is pivotally connected with an arm 107 rigid on the left hand end of an intermittently driven shaft 108 journalled in suitable bearings 109 and 110 depending from the bottom of the base 10. The shaft 108 is provided with a gear 111 meshing with a small gear 112 on a forward shaft 113 journalled in suitable bearings 114 depending from the base 10. Shaft 113 has a gear 115 secured on its right hand end, Figure 3, meshing with gear 36 secured on the clutch shaft 32 which is intermittently driven as described hereinafter. This mechanism is provided for the purpose of rocking the arms 95 back and forth between the positions shown in Figures 6 and 7 to cause the levers 93 and 94 to transfer the stencils from a horizontal position at the bottom of the container 86 to a vertical position within the front guides or holders 91 where the stencils are moved for cooperation with the check or, in other words, in position to have the payee's name or other data applied thereto.

The levers 93 and 94 for advancing the stencils have their free ends provided with shoulders or abutments 93a and 94a, respectively, adapted for engagement with the back edges of the stencils in advancing the same through the curved guideways 89 into the vertically disposed holders 91. The levers also have extended portions 93b and 94b which project forwardly of the rear edges of the stencils and beneath or behind the same to better support and insure advancement of the stencils in moving them to service position. The bottom of the container 86 is provided with a pair of slots 86a at its opposite sides to permit the shoulders 94a of the oppositely disposed levers 94 to pass therethrough when said levers are moved from the position shown in Figure 7 to that shown in Figure 6 and vice versa. It will be understood that the levers 94 serve to move the stencils from the bottom of the container to the intermediate point indicated in Figure 6 and that on each back stroke of the arms 95 the shoulders 93a of the levers 93 will pass under the advanced stencils and return to the position shown in Figure 7 whereby the arm 95 is again in position to be swung forwardly so that the levers 93 may engage and move the stencil downwardly out of the slots or guideways 89 into the guideways formed by the slotted holders 91, it being understood, of course, that the stencil which is moved downwardly by the levers 93 will force those already within the holders 91 downwardly therein against the frictional resistance offered thereby.

Before describing the check feed mechanism which advances the check from the check writer to the stenciling or marking mechanism, the means for holding and moving the check during the stenciling operation will first be described. The holder for the check at the stenciling station is indicated at 116, Figures 2, 6 and 11 and is in the form of a channel, the check being fed into the holder through one end and out through the other after the stenciling operation is completed. The holder is provided with upper and lower front flanges 117 and 118 for guiding the check and between these flanges the holder is left open to permit the check, indicated at 74, to be moved into engagement with the stencil. The holder is provided at its back with an opening 119 through which the pressure element or platen 120 is adapted to operate for pressing the check into engagement with the stencil in opposition to the pressure of the inking element 121 as shown in Figure 7. As will be seen in Figure 11 the upper right hand corner of the holder is cut away, this being necessary to permit operation of the stamp for applying the date to the check which will be described hereinafter. The front edges of the side plates 79 and 80 are cut away to form slots 122 through which the check holder projects and in which it is movable vertically from the normal check receiving position shown in Figure 6 to the lowered stenciling position shown in Figure 7. The means for lowering the holder is properly timed with the movement of the pressure and inking elements 120 and 121 so that when said elements begin to press the check and stencil together, the holder will begin to move down and at substantially the same rate of speed as that at which said elements are moved whereby both check and holder will travel downwardly at the same rate of speed, thereby maintaining the check in proper relative position within the holder. The return stroke of the holder, of course, does not begin until said elements have effected the printing or marking of the payee's name or other characters or data previously determined upon for application to the check or the sheets advanced by the said mechanism.

The means for raising and lowering the check holder comprises a transverse shaft 123, the ends of which are journalled in the side plates 79 and 80, the shaft having oscillatory arms 124, preferably two which have their front ends slotted to receive pins 125 on brackets or lugs 126 suitably secured to the back of the holder as shown in Figures 1, 6 and 7. The right hand end of the shaft projects through side plate 80 and has fixed thereon a crank arm 127, Figure 1, with which is connected a link 128 projecting downwardly through a slot 129 in the base 10, Figure 3. The lower end of the link is connected with a bell crank lever 130 pivoted on a bracket 131 depending from the bottom of the base 10, Figure 7. The bell crank carries a roller 132 which engages a cam 133 timed to raise and lower the check holder as described above. The cam is fixed on shaft 108 driven by gear 111 thereon through the medium of gear 112 on shaft 113 which in turn carries gear 115 driven by gear 36 on the intermittently operated clutch shaft 32 as explained above.

The platen or pressure element 120 is fixed on a shaft 134 having its opposite ends suitably journalled in the side plates 79 and 80, the right hand end of the shaft carrying a pinion 135 meshing with a gear 136 which rotates on a stud 137, Figure 11. Gear 136 meshes with a pinion 138 fixed to a gear 129 both of which rotate on a stud 140. Gear 139 is driven by a train of gears located in front of the stenciling mechanism and includes gears 141, 142 and 143, Figures 6 and 10. Gears 141 and 142 rotate on studs 144 and 145 while gear 143 is rigid on shaft 108 and serves to drive the entire train for actuating the platen or pressure element 120 as well as the printing element 121. The latter is rigid on a shaft 146 having its opposite ends suitable journalled in a pair of frame members 147 and 148, Figure 10 which are supported by the base 10 at a point opposite the stenciling mechanism. Frame 148 is provided with outwardly projecting boss like portions for supporting the studs 144 and 145 and also with a hub 149 carrying an arbor 150 having a gear 151 thereon driven by a pinion 152 fixed to the gear 141 and driven thereby. Arbor 150 has on its inner end a gear 153 for driving the gear 154 on shaft 146 which carries the printing segment 121, Figures 6 and 10. Thus it will be seen that gear 143 on shaft 108 serves to drive the entire train of gears for actuating the pressure and inking elements 120 and 121. The inking segment is rotated in a counterclockwise direction as viewed in Figure 6 and gets its supply of ink or marking material from a roll 155 which is frictionally driven by the inking segment 121 while the latter remains in contact with said roll. The roll is revolubly supported by an arbor 156, the opposite ends of which are carried by the frames 147 and 148. The roll 155 engages and drives an inking roll 157 rotatably supported by a pair of arms 158 which are pivotally connected with the frames 147 and 148 and with which are connected springs 159 for yieldably holding the roll 157 in engagement with roll 155. The inking roll travels in contact with a supply roll 160 which it drives through frictional engagement therewith, the supply roll being rotatably supported by extensions 161 carried by the frames 147 and 148.

It will be understood that as the platen and inking segments 120 and 121 are rotating to press the check and perforated portion of the stencil together, the stencil will be moved downwardly by the rolling action of said elements and will force the lowermost stencil from the holders 91 until it drops by gravity into the receptacle 90 substantially in the position shown in Figure 6. As before stated, the check holder will be moved downwardly at the same time and at the same rate of speed until the printing or transfer operation is completed, after which the holder will be elevated for the reception of another check or form which will be automatically fed into the same by means hereinafter described. Thus, the payee's name and address, and, if desired, the number of the check also, is applied as indicated at the lower left hand corner in Figure 8.

Means is provided for successively moving the discharged stencils from the front end of the drawer or receptacle 90 toward the rear end thereof which means not only prevents them from accumulating beneath the holders 91 but successively positions one against another and moves them step by step in regular order toward the back of the drawer. Means is also provided for maintaining the stencils in proper upright position within the drawer as indicated in Figure 7. In this connection the drawer is provided at a point slightly above its bottom with a longitudinally extending guide bar 162, Figures 6 and 11 on which the stencils are supported and on which is slidably mounted an upstanding support or follower 163 forming a rest for holding the stencils in upright position within the drawer. The support has pivoted on its rear side a small lever 164 having its lower end held in frictional engagement with the bar 162 by a spring 165. The pressure of the spring is such as to normally hold the support against movement upon the bar but is not sufficient to prevent sliding of the same rearwardly thereon when pressure is applied to the stencils in front of the support by the means provided for moving them from beneath the slotted guides 91 which will now be described. This means comprises an actuator or kicker in the form of an arm or lever 166 having its lower end pivotally disposed between the jaws of a forwardly extending bracket 167 on the bottom of the base 10. The upper end of the arm projects through a slot in the base and is provided with laterally extending portions 168 having rearwardly projecting fingers 169 adapted to operate through an opening in the front end of the drawer to engage and move each stencil from its outwardly inclined position against the front wall of the drawer to an oppositely inclined position in engagement with the precedingly positioned stencil. The actuator 166 is provided with a roller 170 engaging a cam 171 on the shaft 108, the cam being timed to move the actuator into position to successively shift the stencils discharged into the drawer to properly position them one against another as indicated in Figure 6. The pressure of the fingers 169 against the stencils is always sufficient to overcome the frictional resistance offered by the support 163 and member 164 in engagement with the bar 162 so that said parts are shifted the same amount each time the actuator 166 is swung to the left as viewed in Figure 6.

Means is provided for successively engaging each stencil positioned by the actuator to hold it in engagement with the previously positioned stencil, this means comprising, preferably a pair of forwardly projecting fingers 172, pivotally supported by a rod 173 having its opposite ends carried by the side frames 79 and 80, Figure 11. The forward ends of the members 172 are shouldered to engage the upper front faces of the stencils as shown in Figure 6 and said ends are provided with inclined or beveled portions 174 so that when the stencils are pushed rearwardly by the actuator they will ride on said beveled portions and raise the fingers to permit the stencils to pass behind the shoulders, the fingers then being returned to the position shown either by gravity or by spring means as desired. It will be understood that in starting the machine the support 163 will be moved to the front end of the drawer so that its front face will occupy substantially the same plane as that occupied by the rear face of the stencil shown at the right of the stack in Figure 6. From this position the support will be moved rearwardly step by step as the actuator 166 is operated by each revolution of the cam 171 to position the stencils as described.

By removing the drawer and placing it in a vertical position over the container 86 the stencils may be discharged into the latter in regular order so that they will be ready for subsequent use whenever desired, it being understood that the inner end of the drawer will be made removable when it is preferred to load the container 86 in the manner described.

The date of issue is applied to the check while it is in position within the holder at the stenciling station, preferably by a suitable dating stamp operated by means timed to be actuated by the intermittently driven shaft 108. In this connection a pad or backing plate for the check is indicated at 175 in Figure 1, the plate being preferably formed integral with a bracket 176 which is suitably secured to the frame plate 80. The check receiving face of the backing plate lies substantially in the same plane as the front face of the holder 116, and the dating operation may take place either before or after the holder is lowered for the stenciling operation, but preferably before. The dating stamp which is indicated generally at 15 is provided with the usual type holder 15a which is guided by a yoke 177 supported by pair of links 178 extending upwardly from oppositely disposed projections 179 on a support 180 suitably secured upon and projecting upwardly from the base 10, Figure 2. The type holder is operated by a plunger 181 reciprocably mounted in the yoke and having its outer end connected with a lever 182 which is pivotally connected at 183 with the support 180, Figure 5. The lower end of the lever projects through an opening in the base 10 and carries a roller 184 in engagement with a cam 185 on shaft 108 which is intermittently driven by shaft 113 through the medium of gears 111 and 112, Figure 3.

The means for feeding the checks or sheets from the position shown in the check writer in Figure 1 into the check holder, and from the latter to the signature applying mechanism is best illustrated in Figures 1, 2, 4 and 5 and comprises two sets of rolls at each end of the check holder. The right hand rolls as viewed in Figure 1 embody two pairs, the inner pair being indicated at 186 and 187, and the outer pair at 188 and 189. The rolls 186, 187 and 188 have fixed axes, while the roll 189 is shiftable into position to cooperate with roll 188 to effect advancement of the check into position between the rolls 186 and 187, the latter of which is frictionally driven by the former, all of the rolls being constantly driven as described hereinafter. A bracket 190, Figure 5, extends upwardly from the base and is provided with a horizontal portion from which extends upwardly a pair of studs 191 for revolubly supporting the rolls 187 and 188, Figure 1. Roll 186 is revolubly supported in frictional engagement with the roll 187 by a vertical shaft 192 journalled in a bearing 192b on the base and also in the upper horizontal portion of the bracket 190, as well as in a bracket 193 depending from the base 10, Figures 2 and 5. The shaft carries a beveled pinion 194 at its lower end meshing with a similar pinion 195 on a constantly driven shaft 196 which is supported by end bearings 197 and 198, also depending from the bottom of the base. Roll 189 is carried by a short shaft 199 journalled in the upper horizontal portion 200 of an oscillatory support 201 carried by the horizontal portion of the bracket 190 and the bearing 192b on the base, Figure 5. Fixed on the shaft 192 and overlying the upper end of the oscillatory support 201 is a pinion 202 meshing with a gear 203 which serves to drive a pinion 204 on shaft 199 carrying the roll 189, Figure 2. Since shaft 192 is constantly driven as described, roll 186 thereon will frictionally drive roll 187 and roll 189 will be driven by said pinion and gears whereby when it is swung from the position shown in Figure 1 toward roll 188 it will engage the check and feed it into position between rolls 186 and 187 which serve to advance the check into the holder 116 where it remains until the stenciling operation is completed.

The feed mechanism just described is substantially duplicated at the left side of the stenciling mechanism and corresponding parts have therefore been given the same reference characters with the addition of the character a to distinguish them from the characters of the right hand feed mechanism.

The oscillatory roll positioning member at the left of the stenciling mechanism is designated by the numeral 201a, Figure 4 and in this feed mechanism, said member is supported by bracket 190a and bearing 192b on base 10, Figure 4. The check feed rolls and the gears and shafts for driving the same at the left operate in the same manner as those at the right of the stenciling mechanism and therefore further description of these parts is not required. The oscillatory supports 201 and 201a are provided with forwardly projecting arms at their lower ends which are connected by a link 205 so that operation of the left hand support effects simultaneous operation of the right hand support.

Support 201a is provided with an additional arm 206 with which is connected a twisted link 207 pivotally connected with the upper end of a short lever 208 which extends downwardly through an opening in the base where it is pivotally supported on a lug 209, Figure 2. The lower end of the lever carries a roller 210 engaging the feed roll cam 211 on a shaft 108a, Figure 4, which is journalled in bearings 109a depending from the base. The cam is provided with a depression 212 into which the roller 210 is moved under the action of the spring 213, at each revolution of the cam, the spring being connected with the link 207 whereby the lever is moved in a clockwise direction as viewed in Figure 4 when the depression 212 moves opposite the roller 210. Thus the link operates arm 206 and support 201a which in turn will simultaneously operate support 201 and both rolls 189 and 189a will therefore be moved for cooperation with rolls 188 and 188a, each set being adapted to advance the check positioned therebetween into engagement with the other set of rolls at the left. It will be understood that by reason of the short length of the depression 212 in the cam 211 that rolls 189 and 189a will be held in operating position only long enough to feed the check into position between the contacting rolls, one set of which feeds the check into the holder 116 and the other out of the same. The length of the check is substantially equal to the length of the holder and when positioned therein it extends between the rolls 188a and 189a and when the roller 210 drops into the depression 212 of cam 211 it remains therein only long enough to permit said rolls to advance the check between the outer set of rolls 186a and 187a which feed it into a stationary holder 214 at the station for applying the maker's signature thereto.

The holder 116 is provided with an opening 215 at its left hand end through which rolls 188a and 189a operate to advance the check when the arm 206 of the oscillatory support 201a is moved toward the front of the machine by link 207 and spring 213, Figure 4, as when the roller 210 drops into the depression 212 of cam 211.

Shaft 196 which is adapted to constantly drive the feed rolls is provided with a gear 216 driven by a gear 217 pivoted on the bracket 110 and a gear 218 loose on shaft 113, Figure 3. Gear 218 is driven by gear 35 on sleeve 33 which is constantly driven by worm 30 and worm wheel 31, Figure 13.

The check signing mechanism, best shown in Figures 1 and 2, preferably comprises one of the offset printing units shown and described in application, Serial No. 142,194 referred to above. The signature of the maker of the check is indicated by way of example at 219 in Figure 8 and if preferred, a photograph of the maker may be applied thereto at the same time in the manner described in said application.

The printing form or plate upon which the signature is etched for reproduction, preferably constitutes a thin zinc plate 220 in the form of a circular band suitably clamped upon a roll 221 fixed upon and adapted to be driven by a shaft 222 supported by a bracket 223 carried by the base, Figures 2 and 3, the lower end of said shaft being journalled in the bracket. The shaft is provided with a gear 225 meshing with a pinion 226 revolubly supported by a stud on the bracket and driven by a gear 227 on a vertical shaft 228 having its upper end journalled in the bracket and its lower end projecting through and journalled in the base 10. Shaft 228 is provided with a beveled pinion 229 driven by a similar pinion 230 on the horizontal stub shaft 108a journalled in bearings 109a depending from the base, Figure 2.

The signature 219 is transferred from the plate 220 to a printing strip or blanket 231 suitably clamped in a groove in the face of the blanket roll 232. This roll is provided with extended hubs and has a pivot pin therein, not shown, but upon which the roll is adapted to rotate. The opposite ends of the pin have studs 233 projecting therein to support the same, the studs being carried by triangular shaped plates 234 disposed inwardly of a pair of frame plates 235 and being pivoted thereon at 236, Figure 1. The plates 234 constitute adjustable arms for supporting the blanket roll to permit it to be adjusted toward and from the plate roll whereby to regulate the pressure between the printing plate and the blanket. This is done by means of an adjustable screw 237 which extends through an outwardly turned lug 238 on the arm and which is threaded into an outwardly turned lug 239 on the plate 235. A locking screw 240 is threaded into the lug 248 to hold the arm in adjusted position. The plates 235 form supports for the series of spring pressed inking rolls shown in Figure 1 and also for the pressure rolls thereon and the springs and other parts carried thereby, which are the same as in any one of the printing or check signing units disclosed in application, Serial No. 142,194, referred to above.

The blanket roll carries a gear 241 suitably secured thereto which is driven by a pinion 242 on the upper end of shaft 228, Figures 1 and 2. The blanket or printing roll 232 carrying the signature of the maker of the check operates to engage the check through an opening in the front of the stationary check holder or guide 214 and the platen 243 for pressing the check into engagement with the printing roll operates through an opening in the back of the guide and also through an opening 244 in a frame member 245 extending upwardly from the base and forming a support for the platen 243 as well as for the guide, which may be secured thereto in any desired manner. The platen is carried by an arm 246 carried by a stud 251 extending through the arm and having its inner end suitably secured to the frame member.

It will be understood, as stated above, that the feed rolls 186a and 187a which operate through openings in the guide are timed to feed the checks in proper position therein to have the signatures applied thereto during each revolution of the printing roll 232. The checks are fed from the guide by the printing and platen rolls during the printing operation and are discharged into the receiver 18 as they pass from the guide. The receiver may be of any preferred form, being shown, in the present instance, as a plate having a flange 18a for supporting the check, the plate being preferably supported by the frame 245 in the manner shown in Figures 14 and 15.

In the clutch mechanism shown in Figures 13 and 14 the worm wheel 31 is loosely mounted on shaft 32 and carries a ratchet wheel 252 opposite a disk 253 spaced from the worm wheel by a hub 254 thereon. The disk has a hub 255 fixed on shaft 32 adjacent a removable cover 256 at the outside of the casing 22. The disk when coupled with the ratchet wheel is driven in the direction indicated by the arrow in Figure 12 by means of a driving pawl 257 pivoted at 258 on the disk and having a pin 259 projecting through an opening 260 in the disk and into the notched end of the dog 261 pivoted on the outside of the disk. The pawl 257 is moved into engagement with the ratchet wheel by a spring 262 when the dog is released, the spring having one end connected with the pin 259 and the other with the disk. The dog is normally retained in position to hold the pawl out of engagement with the ratchet wheel by a latch 263 fixed on a rod 264 journalled in the side walls of the housing 22 as shown in Figure 13. A member 265 is mounted loosely on the rod and is in position to engage a shoulder 266 on the periphery of the disk to prevent backward movement of the latter when the disk is disconnected from the ratchet wheel. A spring pressed plunger 267 serves to hold member 265 in engagement with the periphery of the disk as shown in Figure 12.

A second pawl 268 is pivoted on the disk 253 for engagement with the teeth of the ratchet wheel to prevent the disk from running ahead of the latter under any operating conditions tending to produce such a result. Pawl 268 carries a pin 270 projecting through an opening 271 in the disk and a spring 272 has one end connected with the pin and the other with the disk, Figure 12, whereby the pawl is yieldably held in engagement with the ratchet wheel. An adjustable stud 273 projects through the wall of the casing and extends in the path of the tail portion of the pawl 268 which serves to release the latter when the parts reach the throw-out position shown in Figure 12 so that during continued rotation of the ratchet wheel the pawl will not engage the same until the opposite pawl 257 is moved into engagement with the wheel.

The pawl 257 is automatically thrown out of engagement with the ratchet wheel by the latch 263 at the end of each revolution of the disk whereby the shaft 32 for oscillating the main shaft 45 of the check writer is brought to a standstill at the desired point, as when the actuating parts for the check writer are in the position shown in Figure 9.

The outer end of rod 264 is provided with an arm 274 which carries an inwardly turned portion 275 at its lower end adapted to receive the shouldered end of an operating link 276 pivoted at 277 to an angle lever having a downwardly extending portion 278 and a rearwardly extending horizontal portion 279. The portions 278 and 279 are connected by a transverse portion 280. A U-shaped member 281 is secured to the bottom of the base 13, Figures 2 and 9 and its downwardly projecting end portions extend between the vertical and horizontal arms 278 and 279 of the lever which is supported by a pin 282 extending through said arms and said portions to form a pivot on which the lever is adapted to swing. A link 283 extends upwardly from the lever arm 279 through the check writer casing and is pivotally connected with the finger bar 72 as shown in Figure 9. A shorter link 284 is connected with the link 283 intermediate its ends and has its upper end pivotally connected with the bar 72 whereby, upon depression of the same, the angle lever will have its vertical arm 278 moved toward the left as viewed in Figure 9. A pull is thereby exerted on the link 276 to rock the arm 274 and the rod 264 so that the latch 263, Figure 12 will be swung upwardly to release the dog 261 and allow the pawl 257 to be moved into engagement with the continuously driven ratchet wheel 252. The link 276 is held in engagement with the arm 274 by a spring 283 connected with its outer end and extended upwardly and connected with the lever arm 278. A second spring 284 extends between the lever arm 278 and the upper end of arm 274 rigid on rod 264 whereby said rod and the latch thereon are returned to position in the path of the dog 261 to stop the disk at the end of each revolution thereof. It will be understood that upon depression of finger bar 72 shaft 264 will be rocked to release latch 263 and dog 261 whereby spring 262 will move pawl 257 to engage ratchet wheel 252 by which it is driven. Following each revolution of the disk 253 the pawl 257, as stated above, will be released to disconnect the disk and ratchet wheel so that the parts of the machine driven by clutch shaft 32 and gear 36 thereon will automatically come to a stop to discontinue operation of driving shafts 108, 108a and 113 while shaft 196 for driving the feed rolls continues to be operated by the gear train driven by gear 35 on sleeve 33.

The operation of the machine will best be understood by considering the timing diagram shown in Figure 16 in which it is assumed that the check has had the amount applied thereto by the check writer and that the feed rolls at the right hand side of the stenciling mechanism have advanced the check into the holder 116. After this has been done, assuming the parts to be in the position shown in Figures 5 and 6, the dating stamp will be operated by cam 185 during the first quarter revolution of shaft 108 and the kicker for positioning the discharged stencils in receptacle 90 will be operated simultaneously therewith into and out of the receptacle by cam 171 on said shaft. During this time the stencil feed members are being moved upwardly by cam 133 from the position shown in Figure 6, and continue to move through the second quarter until they arrive at the position shown in Figure 7. During the first half of the second quarter the check holder 116 and the check therein are being moved downwardly under the control of spring 128a and cam 133, and during this time the payee's name is stenciled on the check by means of the platen and printing elements 120 and 121, respectively which operate simultaneously with the downward movement of the check holder 116. After this stenciling operation there is a dwell of the check holder in the last half of the second quarter, following which the holder is elevated during the third quarter to the position shown in Figure 6. In the second half, the stencil feed moves downwardly as indicated by the diagram, during which time the stencil is being transferred from a horizontal position at the bottom of the chute 86 to a vertical position within the guides 91. During the last part of the fourth quarter the feed rolls 188a and 189a are brought together by the action of cam 211 on stub shaft 108 to momentarily engage and move the check between the contacting rolls 186a and 187a which feed it into the stationary holder 214. At the same time, feed rolls 188 and 189 are moved together to engage the next succeeding check held by the check writer, that is after the operator has manipulated the keys to apply the correct amount, said rolls serving to advance the check between the rolls 186 and 187 which begin to feed the check into the holder 116 while the rolls 186a and 187a are operating to remove the preceding check to position it within the holder or guide 214. While the check is within the guide 214, the properly timed printing or marking roll 232 of the check signing mechanism, which is intermittently driven by the stub shaft 108a, moves to engage and print the maker's name on the check, through co-operation with the platen and roll 232. During the printing operation, roll 232 advances the check to move it from the guide 214 to the receiver 18 as previously stated.

It will be understood that the operations described above take place following each depression of the finger bar 72 which is actuated by the operator after he has set up the proper amount to be printed on the check by manipulation of the keys 73. Depression of the finger bar, as stated above, connects the clutch with the motor driven worm wheel 31 whereby rotation of shaft 32 and gear 36 for intermittently driving shafts 113 and 108, as well as stub shaft 108a, is effected. Upon each complete revolution of the driving disk 253, the latter is automatically disconnected from the worm wheel as previously described and all of the operating parts of the machine come to a standstill except the constantly driven shaft 196 and its actuating parts and the feed mechanism which it is adapted to drive, including the constantly driven feed rolls.

The clutch forms a driving unit for the several marking or character applying mechanisms and is so constructed as to have a part thereof driven continuously by the motor, which part operates the actuating mechanism for the check feed rolls, the latter being driven continuously as described above. There are provided actuating mechanisms for the dating stamp, the stenciling mechanism and the signature applying mechanism, as well as the check writer, and these actuating mechanisms are all driven intermittently and in proper timed relation by that portion of the clutch unit which is periodically coupled with the constantly driven portion thereof, through depression of the finger bar 72 following each setting up operation by manipulation of the check writer keys 73. Thus, it will be seen that the checks or forms have certain selected characters applied at one station and that they are subsequently advanced to a second station where separate marking mechanisms are adapted to apply certain other characters and that from this station they are advanced to a third station for the application of other characters, all of said actuating mechanisms being properly timed and coordinated and operated by a common driving unit.

The operation of the stenciling or second marking mechanism to operate upon the checks or sheets is of course timed to present the character holding elements in proper position within the holders 91 and a very important feature of this mechanism is that it serves to move each of said elements to a display position upon the holders in advance of the setting up operations of the check-writer. In the display position of said elements the operator observes the characters or legends thereon and determines from the same the characters or legends to be set up on the check writer which are intended to correspond with those displayed by said elements, the latter being subsequently applied by the second marking mechanism to operate upon the sheets. The stencils or character holding elements are in display position when at the top of the holders 91 as indicated in Fig. 2 and are subsequently moved from this position to the lower position shown in this figure, preferably by a succeeding character holding element which assumes the same display position occupied by the previously displayed element. It will be understood that these character holding elements may be constructed in any suitable or desired manner and that they may be provided with any preferred form of indicating or identifying marks, characters or legends which will enable the operator of the marking mechanism 14 to determine what keys thereof to manipulate in order to apply to the sheets therein the characters which have been predetermined for use or association with those to be applied subsequently at the second station by the marking mechanism 16.

I claim as my invention:

1. In a machine of the class described, the combination of separate marking mechanisms for successively placing characters upon separate sheets at different printing stations, transfer means for individually moving the sheets from a position of rest at one station to another, an actuating mechanism for each of said marking mechanisms, said actuating mechanisms being adapted to operate in proper timed relation to effect successive operation of said marking mechanisms and a driving unit for said transfer means and said actuating mechanisms comprising a constantly driven part and an additional part adapted to be manually coupled with said constantly driven part to effect periodic operation of said actuating mechanisms said transfer means, said unit having means for automatically disconnecting the additional parts from said constantly driven part subsequent to each operation of the marking mechanism last to be actuated.

2. In a machine of the class described, the combination of separate marking mechanisms for successively placing characters upon separate sheets at different stations, transfer means for individually moving the sheets from a position of rest at one station to another, actuating mechanisms for said transfer means and said marking mechanisms arranged to operate in proper timed relation with respect thereto and a driving unit arranged to be simultaneously coupled with said actuating mechanisms and to be periodically and automatically disconnected therefrom.

3. In a machine of the class described, the combination of two adjacent marking mechanisms for successively placing characters upon separate sheets at different stations, a transfer mechanism arranged to move the sheets from the marking mechanism first operating upon the sheet to the adjacent marking mechanism the first mentioned marking mechanism being adapted to apply the characters while the sheet is at rest and separator actuating mechanisms for the marking mechanisms and for the transfer mechanism arranged to operate in proper timed relation and to automatically discontinue operation when the characters have been applied by said adjacent marking mechanism.

4. In a machine of the class described, the combination of two adjacent marking mechanisms for successively placing characters upon separate sheets, a transfer mechanism arranged to move the sheets one by one from a position of rest at the marking mechanism first operating to apply characters to the sheet to the adjacent marking mechanism, actuating mechanisms for operating the marking mechanisms and a driving unit having parts for constantly operating the transfer mechanism and having other parts periodically operating the actuating mechanisms for the marking mechanisms.

5. In a machine of the class described, the combination of two marking mechanisms for successively placing characters upon sheets, one of said mechanisms being selectively controlled whereby to determine the characters to be applied by it to the sheet and the other mechanism having character holding elements with devices for successively positioning the elements at a predetermined point and with other devices for simultaneously engaging the opposite sides of said elements while at said point whereby to duplicate the characters thereof on the sheet, transfer means for advancing the sheet from the selectively controlled mechanism to said point and actuating means for said selectively controlled mechanism, said transfer means and said devices adapted to operate the same in proper timed relation.

6. In a machine of the class described, the combination of two marking mechanisms for placing characters upon sheets each having holding means for the sheet, one of the mechanisms having means for selecting the characters to be applied by it to the sheet said characters being applied while the sheet is at rest in its holding means, transfer means for moving the position of rest on the sheet from the holding means of the selective marking mechanism to the holding means of the other marking mechanism, the sheet when supported by the first mentioned holding means having a portion thereof in position to be engaged by said transfer means upon operation of the latter and actuating means for said marking mechanisms and said transfer means adapted to operate the same in proper timed relation.

7. In a machine of the class described, the combination of two marking mechanisms for placing characters upon sheets each having holding means for the sheet, one of the mechanisms having means for selecting and applying the characters to the sheet while the latter is at rest, transfer means for moving the sheet from the holding means of the selective marking mechanism to the holding means of the other marking mechanism, the sheet when supported by the first mentioned holding means having a portion thereof in position to be engaged by said transfer means upon operation of the latter, actuating means for said marking mechanisms and said transfer means adapted to operate the same in proper timed relation, and additional transfer means operated by said actuating means for moving the sheet from the second marking mechanism to operate upon the sheet.

8. In a machine of the class described, the combination of two marking mechanisms for placing characters upon sheets, one comprising a selective character applying mechanism for applying the characters while the sheet is at rest and the other a marking mechanism comprising cooperating units, one unit being adapted for successively positioning a series of separate and independent character holding stencil elements at a predetermined point and the other unit comprising devices for simultaneously engaging the opposite sides of said stencil whereby to duplicate the characters thereof on the sheet when the latter is presented at said point, transfer means for conveying the sheet from said selective character applying mechanism to said point and actuating means adapted to operate said selective character applying mechanism, said transfer means and said units in proper timed relation.

9. In a machine of the class described, the combination of two mechanisms for placing characters upon sheets, one comprising a printing mechanism having means for supporting the sheets at rest during the printing operations and including a series of selectively controlled printing characters with actuating means for periodically moving the characters into engagement with the sheets, the other of said mechanisms comprising marking means having cooperating character applying devices arranged to operate upon the sheets when presented at a predetermined point, transfer means for the sheets timed to advance the same from the position of rest to said point subsequent to operation of the printing mechanism and power means timed to operate said actuating and transfer means and said character applying devices in properly timed relation.

10. In a machine of the class described, the combination of two mechanisms for placing characters upon sheets, one comprising a selective key controlled printing mechanism having means for supporting the sheets to be printed at rest and the other a marking mechanism including separate and independent character holding elements, devices arranged for successively positioning said elements by a bodily movement to a predetermined point, means for operating the printing mechanism, means for subsequently advancing the sheets from the position of rest to said point and means cooperating with said elements at said point for duplicating the characters thereof upon the sheet.

11. In a machine of the class described, the combination of a plurality of mechanisms for placing characters upon sheets, one comprising a selective key controlled printing mechanism having means for supporting the sheets to be printed at rest during the printing operation and another marking mechanism having separate and independent character holding elements, devices arranged for successively positioning said elements by a bodily movement to a predetermined point, transfer means for advancing the sheets from the printing mechanism to said point, means for cooperating with said elements at said point for duplicating the characters thereof upon the sheet, a second marking mechanism, transfer means for advancing the sheets to said second marking mechanism and means adapted to operate said devices, said transfer means and said mechanisms in proper timed relation.

12. In a machine of the class described, the combination of two mechanisms for placing characters upon sheets, one comprising a selective key controlled mechanism having means for supporting the sheets to be printed at rest and the other a marking mechanism including separate and independent character holding elements, devices arranged for successively positioning said elements by a bodily movement to a predetermined point, a holder for the sheets adjacent said point, means for advancing the sheets from the key controlled mechanism to said holder and means cooperating with said elements at said point for duplicating the characters thereof upon the sheets.

13. In a machine of the class described, the combination of two mechanisms for placing characters upon sheets, one comprising a printing mechanism having means for supporting the sheets to be printed at rest during the printing operations and the other a marking mechanism having character holding elements with a container for supporting said elements, devices arranged for successively moving said elements bodily from the container and positioning them at a predetermined point, means for advancing the sheets one by one from the printing mechanism to said point and means cooperating with said elements at said point for duplicating the characters thereof upon the sheets.

14. In a machine of the class described, the combination of two mechanisms for placing characters upon sheets, one comprising a printing mechanism having means for supporting the sheets to be printed at rest during the printing operations and the other a marking mechanism having separate and independent character holding elements and having a holder for receiving the sheets from the printing mechanism, said holder being movable to and from a predetermined point, means for transferring the sheets from the printing mechanism to said holder, devices arranged for successively moving said elements bodily to said point, means for moving the holder to and from said point and means forming a part of the marking mechanism and cooperating with said elements at said point for duplicating the characters of the elements upon the sheet.

15. In a machine of the class described, the combination of two mechanisms for placing characters upon sheets, one comprising printing mechanism having means for supporting the sheets to be printed while at rest and the other a marking mechanism having character holding elements and having a holder for receiving the sheets from the printing mechanism, said holder being movable to and from a predetermined point, means for transferring the sheets from the printing mechanism to said holder, devices arranged for successively moving said elements bodily to said point, means for moving the holder to and from said point, means forming a part of the marking mechanism and cooperating with said elements at said point for duplicating the characters of the elements upon the sheet and means for moving the sheets from the holder.

16. In a machine of the class described, the combination of two oppositely arranged marking mechanisms for successively placing characters upon separate sheets, means for transferring the sheets one by one from the first marking mechanism to operate thereon to the opposite marking mechanism, the latter comprising cooperating parts for receiving the sheets and for simultaneously moving and marking the same including bodily movable character holding elements and actuating means for said marking mechanisms and said transfer means adapted to operate the same in proper timed relation.

17. In a machine of the class described, the combination of two oppositely arranged marking mechanisms for simultaneously applying characters upon separate sheets, a transfer device for moving the sheets one by one from the first marking mechanism to operate thereon to the opposite marking mechanism, the latter comprising a reciprocally mounted holder for receiving the sheets and means for moving it from the returning it to the receiving point together with means for marking the sheets while being moved by the holder and actuating means for said marking mechanisms and said transfer device adapted to operate the same in proper timed relation.

18. In a machine of the class described, the combination of two oppositely arranged marking mechanisms for simultaneously applying characters upon sheets, a transfer device for moving the sheets from a position of rest in the first marking mechanism to operate thereon to the opposite marking mechanism, the latter comprising a reciprocally mounted holder for receiving the sheets and means for moving it from and returning it to the receiving point together with means for marking the sheets while being moved by the holder, a second transfer device adapted to remove the sheets from the holder when the latter is returned to the receiving point and actuating means for said marking mechanisms and said transfer devices adapted to operate the same in proper timed relation.

19. In a machine of the class described, the combination of two oppositely arranged marking mechanisms for successively applying characters upon sheets, a transfer device for moving the sheets from the first marking mechanism to operate thereon to the opposite marking mechanism, the latter comprising a reciprocally mounted holder for receiving the sheets and means for moving it from and returning it to the receiving point together with means for marking the sheets while being moved by the holder, a second transfer device adapted to remove the sheets from the holder when the latter is returned to the receiving point, an additional marking mechanism adapted to receive the sheets from the second mentioned transfer device and actuating means for said marking mechanisms and said transfer devices adapted to operate the same in proper timed relation.

20. In a machine of the class described, the combination of two marking mechanisms for placing characters upon separate sheets, one being adapted to apply the characters to the sheets while the sheets are at rest thereon and the other comprising cooperating parts for receiving the sheets at a predetermined point and for simultaneously moving and marking the same and for returning them to said point, a transfer device for moving the sheets from the first marking mechanism to operate thereon to the second, and actuating means for said marking mechanisms and said transfer device arranged to operate the same in proper timed relation.

21. In a machine of the class described, the combination of two marking mechanisms for placing characters upon a check or the like, one comprising a printing device for applying to the check the amount for which it is to be issued, a support for maintaining the check in position to be printed, the other marking mechanism comprising a movable holder for receiving the check at a predetermined point together with cooperating devices for applying the name of the payee thereon while supported by the holder, means for moving the holder during the name applying operations and for returning it with the check thereon to the receiving point, transfer means for moving the check from the support to the holder subsequent to said printing operation and actuating means for effecting operation of said marking mechanisms and said transfer means in proper timed relation.

22. In a machine of the class described, the combination of two marking mechanisms for placing characters upon a check or the like, one comprising a printing device for applying to the check the amount for which it is to be issued, a support for maintaining the check at rest in position to be printed, the other marking mechanism comprising a holder for the check together with cooperating devices for applying the name of the payee thereon while supported by the holder, transfer means for moving the check from the support to the holder subsequent to said printing operation, said transfer means being arranged to receive a portion of the check when held by the support and adapted subsequent to said printing operation to transfer the check to the holder, and actuating means for effecting operation of said marking mechanisms and said transfer means in proper timed relation.

23. In a machine of the class described, the combination of two adjacent mechanisms for successively marking characters upon a check or the like, a transfer mechanism arranged to move the check from a position of rest the marking mechanism first operating thereon to the adjacent marking mechanism, a part of said transfer mechanism being in position to receive a portion of the check when the latter is at rest in position to be operated upon by the first marking mechanism and actuating means adapted to operate said marking mechanisms and said transfer mechanism in proper timed relation.

24. In a machine of the class described, the combination of two adjacent marking mechanisms for successively placing characters upon a check or the like, each having a holding device for the check, a transfer mechanism for moving the check from the holding device of the marking mechanism first to apply characters to the check to the opposite holding device, said transfer mechanism comprising two sets of feed rolls, the rolls of one set being normally spaced apart to receive a portion of the check when the latter is supported by the holding device first to receive the check and being adapted to feed the check into engagement with the other set of rolls subsequent to operation of the marking mechanism first operating upon the check and actuating means adapted to operate said marking mechanisms and said feed rolls in proper timed relation.

25. In a machine of the class described, the combination of two adjacent marking mechanisms for successively placing characters upon a check or the like, each having a holding device for the check, a transfer mechanism for moving the check from the holding device of the marking mechanism first to apply characters to the check to the other holding device, said transfer mechanism comprising two sets of feed rolls, the rolls of one set being normally spaced apart to receive a portion of the check when the latter is supported by the holding device first to receive the check and being adapted to feed the check into engagement with the other set of rolls subsequent to operation of the marking mechanism first operating upon the check, a second transfer mechanism having feed rolls for removing the check from the marking mechanism last to operate thereon, and actuating means adapted to operate said marking mechanisms and said feed rolls in proper timed relation.

26. In a machine of the class described, the combination of two mechanisms for successively placing characters upon sheets, one comprising a printing mechanism having means for supporting the sheet to be printed, and the other a marking mechanism having a series of character holding elements with holding means for the elements, guide means for receiving said elements, positioning devices arranged for successively moving said elements bodily from the holding means and positioning them at a predetermined point upon the guide means, a holder for the sheet mounted adjacent said point, marking devices for pressing said elements and said sheets together whereby to duplicate upon the latter the characters of the former, means for transferring the sheets from said supporting means to the holder subsequent to operation of the printing mechanism and actuating means for operating said positioning devices, said marking devices and said printing and transfer mechanisms in proper timed relation.

27. In a machine of the class described, the combination of two mechanisms for placing characters upon a sheet, one comprising a printing mechanism having means for supporting the sheet to be printed and the other a marking mechanism comprising a movable holder for the sheet together with character holding elements and means for supporting and guiding the same, devices arranged for successively moving the character holding elements to a predetermined position upon the guides, movable marking devices arranged for cooperation with the character holding elements and the sheet upon the holder for duplicating the characters of said elements on the sheets, actuating devices for said marking devices and said holder arranged to move the same at substantially the same rate of speed during the duplicating operations, a receptacle for receiving the character holding elements from the marking devices, a device for successively positioning said elements in a predetermined order within the receptacle and actuating means for operating said devices, said mechanisms and said holder in proper timed relation.

28. In a machine of the class described, the combination of two mechanisms for placing characters upon sheets, one comprising a printing mechanism having means for supporting the sheets to be printed and the other a marking mechanism having a holder for the sheets and a series of character holding elements with holding means therefore together with guides for receiving said elements from the holding means, devices arranged for successively positioning the elements at a predetermined point within the guides by movement of one against another, a receptacle into which said elements are fed from the guides by pressure applied by a succeeding element, rotatably mounted devices for pressing the sheets and character holding elements together adapted during rotation to advance the elements within the guides and serving to duplicate the characters of said elements upon the sheets, transfer mechanism for moving the sheets from the printing mechanism to the holder, mechanism adapted to move the holder at a rate of speed substantially corresponding to that of the advancing character holding elements, devices for automatically and successively moving the character holding elements discharged into the receptacle to a predetermined position therein, and means for actuating the said mechanisms and devices in proper timed relation.

29. In a machine of the class described, a marking mechanism for applying characters to sheets and the like comprising a vertically disposed holder having side and bottom walls for supporting the parts, means for successively transferring the sheets from a predetermined point to a position within the holder, a support provided with a series of character holding elements, means for successively moving said elements from the support and positioning them at one side of the holder and means arranged to cooperate with said sheets while upon the holder and said elements to duplicate the characters of the latter upon the sheets.

30. In a machine of the class described, a marking mechanism for applying characters to sheets and the like comprising a movable holder for supporting the sheets during the marking operations, a support provided with a series of character holding elements, means for guiding said elements from the support to a point opposite the holder, means for advancing said elements upon the guide means from the support to said point, cooperating devices for pressing said sheets and said elements together adapted to move the latter from said point and arranged to duplicate the characters of said elements upon the sheets while moving the same and during support by the holder, means for moving said device to advance the elements at a predetermined rate of speed and means for simultaneously moving the holder to move the sheets substantially at the rate of speed of said elements.

31. In a machine of the class described, a marking mechanism for applying characters to sheets and the like comprising a movable holder for supporting the sheets, during the marking operations, a support provided with a series of character holding elements, means for guiding said elements from the support to a point opposite the holder, means for advancing said elements upon the guide means from the support to said point, cooperating devices for pressing said sheets and said elements together adapted to move the latter from said point and arranged to duplicate the characters of said elements upon the sheets while moving the same and during support by the holder, means for moving said devices to advance the elements at a predetermined rate of speed, means for simultaneously moving the holder at substantially the same rate of speed, said elements serving each to discharge from the guide means one of the previously used elements thereon, a receptacle for receiving said discharged elements, and automatic means for successively moving the discharged elements one by one within the receptacle from the point at which they are received therein.

32. In a machine of the class described, a marking mechanism for applying characters to sheets and the like comprising a movable holder for supporting the sheets during the marking operations, a support provided with a series of character holding elements, means for guiding said elements from the support to a point opposite the holder, means for advancing said elements upon the guide means from the support to said point, cooperating devices for pressing said sheets and said elements together adapted to move the latter from said point and arranged to duplicate the characters of said elements upon the holder to move the sheets while moving the same, means for moving said devices to advance the elements at a predetermined rate of speed, means for simultaneously moving the holder at substantially the same rate of speed, said elements serving each to discharge from the guide means one of the previously used elements thereon, a receptacle for receiving said discharged elements, an upstanding support for said elements guided for movement within the receptacle and having means for frictionally holding it in different positions of adjustment therein and automatic means for successively positioning the elements discharged into the receptacle one upon another and in position to be held by the support, the pressure of said means upon the elements serving to move the latter and the support therefor step by step during continued operation of the positioning means.

33. In a machine of the class described, a marking mechanism for applying characters to sheets and the like comprising a vertically disposed holder for the sheets, a vertical container positioned above and at one side of the holder adapted to carry a stack of horizontally disposed character holding elements, guides for reciving said elements adapted to support them in vertical position at a point opposite the sheets carried by the holder, means forming curved guideways extending from the bottom of the container downwardly to said guides, means for successively moving said elements from the bottom of the container downwardly through said curved guide-ways, each downwardly moved element serving to advance a previously moved element into position to be held by said guides and devices cooperating to duplicate the characters of the elements held by the guides upon the sheets supported by the holder.

34. In a machine of the class described, a marking mechanism for applying characters to sheets and the like comprising a vertically disposed holder for the sheets, a vertical container positioned above and at one side of the holder adapted to carry a stack of horizontally disposed character holding elements, guides for receiving said elements adapted to support them in vertical position at a point opposite the sheets carried by the holder, means forming curved guide-ways extending from the bottom of the container downwardly to said guides, means for successively moving said elements from the bottom of the container downwardly through said curved guide-ways, each downwardly moved element serving to advance a previously moved element into position to be held by said guides, devices cooperating to duplicate the characters of the elements held by the guides upon the sheets supported by the holder, said devices serving to simultaneously move said elements and said sheets together during the duplicating operation and means for moving the holder simultaneously with the movement of said devices at substantially the same speed at which said elements are moved by said devices.

35. In a machine of the class described, the combination of two adjacent marking mechanisms for successively placing characters upon sheets, one comprising a selective printing mechanism for operating upon the sheets while at rest therein, a transfer mechanism arranged to move the sheets from a position of rest in the selective marking mechanism to the adjacent marking mechanism, a driving unit, actuating devices for said last mentioned marking mechanism and said transfer mechanism adapted to be operated by said driving unit and an operating connection between said driving unit and the first marking mechanism operating upon the sheet, said operating connection comprising driving and driven parts detachably connected whereby automatic operation of the last mentioned marking mechanism may be discontinued at will.

36. In a machine of the class described, a selective marking mechanism for successively applying legends to sheets or the like, said legends being selected to correspond to other predetermined legends within the machine, means for successively displaying the last mentioned legends in advance of the selection of the first mentioned legends to afford an indication of the selections to be made and means adapted to operate said display means and said marking mechanism in proper timed relation.

37. In a machine of the class described, a selective marking mechanism for successively applying legends to sheets or the like, said legends being selected to correspond to other predetermined legends to be subsequently applied to the sheets, devices for successively displaying the last mentioned legends in advance of the selection of the first mentioned legends, mechanism for subsequently duplicating the displayed legends upon the sheets and means adapted to operate said last mentioned mechanism, said marking mechanism and said devices in proper timed relation.

38. In a machine of the class described, a selective marking mechanism for successively applying legends to sheets or the like, said legends being selected to correspond to other predetermined legends, a series of elements having the last mentioned legends thereon, devices for successively moving said elements to a predetermined display position in advance of the selection of the first mentioned legends, mechanism for subsequently duplicating the legends of said elements upon said sheets and means adapted to operate said last mentioned mechanism, said marking mechanism and said devices in proper timed relation.

39. In a machine of the class described, a selective marking mechanism for applying legends to sheets or the like at a predetermined station, said legends being selected to correspond to other predetermined legends to be subsequently applied to the sheets at a second station, transfer means for moving the sheets from the first to the second mentioned station, a series of elements having said predetermined legends thereon, devices for successively displaying said elements in advance of the selection of the first mentioned legends, mechanism for subsequently duplicating the legends of said elements upon the sheets at the second mentioned station and means adapted to operate said last mentioned mechanism, said selective marking mechanism, said transfer means and said devices in proper timed relation.

40. In a machine of the class described, the combination of two marking mechanisms for successively applying different predetermined legends upon each of a series of sheets at two different stations, one of said mechanisms being selectively controlled and the legends to be applied by it at the first station being selected to correspond to those subsequently to be applied to the sheets at the second station, the second marking mechanism comprising a series of elements each having one of the last mentioned legends thereon, means for successively positioning said elements at a predetermined point to display the same in advance of the selection of the legends first to be applied to the sheets, said elements serving when moved to said point to advance a preceding element to the second station, devices cooperating with said elements at the second station to duplicate the legends thereof upon the sheets, transfer means adapted to move the sheets from the first to the second mentioned station and means arranged to operate said marking mechanisms and said transfer means in proper timed relation.

41. In a machine of the class described, a container for supporting a series of superimposed character holding elements, said container having spaced openings in its bottom, a pair of holders for receiving said elements, said holders being spaced from and at one side of the container, guide-ways leading from the bottom of the container to said holders, devices arranged to operate within said openings to engage the lowermost element of the container and to advance the same into said guide-ways, additional devices arranged to subsequently engage and advance the elements into engagement with said holders, means adapted to operate said first and second mentioned devices in proper timed relation, means for printing characters upon separate sheets while at rest, means for advancing the sheets one by one to a point opposite the character holding elements positioned in said holders and cooperating devices for effecting duplication of the characters of said elements on the sheets.

42. In a machine of the class described, a frame, a vertically disposed channel-shaped sheet holder adjustable upon the frame means for printing characters upon the sheets, means for successively feeding the sheets one by one into the holder, the latter having openings through its vertical walls, a plurality of stencils, means for successively feeding the stencils into registry with said openings, platen and marking rolls adapted to operate through said openings to simultaneously press the stencils and sheets together whereby to duplicate the characters of the stencils upon the sheets and means adapted to operate said holder and said rolls in proper timed relation.

43. In a machine of the class described, the combination of two adjacent marking mechanisms for successively placing characters upon sheets, a transfer mechanism arranged to move the sheets one by one from the marking mechanism first operating thereon to the adjacent marking mechanism, a driving unit, actuating devices for said last mentioned marking mechanism and said transfer mechanism adapted to be operated by said driving unit and an operating connection between said driving unit and the first marking mechanism operating upon the sheet, said operating connection comprising driving and driven parts detachably connected, and said driven part being arranged to receive a member for effecting manual operation of the marking mechanism first to operate upon the sheets.

44. In a machine of the class described, a selective marking mechanism for setting up and applying characters to sheets and the like, an oscillatory shaft for actuating said mechanism, a rotary driving element, cooperating actuating devices for oscillating the shaft subsequent to the setting up operations, a part actuated by the driving element, a releasable operating member for connecting and disconnecting said part with one of said actuating devices and a second marking mechanism arranged to operate upon the sheets and adapted to be actuated by said rotary element.

45. In a machine of the class described, a selective marking mechanism for setting up and applying characters to sheets and the like, oscillatory actuating means for said mechanism, an oscillatory member operatively connected with said actuating means for oscillating said member subsequent to the setting up operations, rotary driving means, a part releasably connecting the rotary driving means with said oscillatory member, said oscillatory actuating means being adapted for the reception of means for manually operating the same when said part is released and a second marking mechanism arranged to operate upon the sheets and adapted to be actuated by said rotary driving means.

46. In a machine of the class described, a selective marking mechanism for successively applying characters to sheets or the like, said characters being selected to correspond to other predetermined characters to be subsequently applied to the sheets, devices for successively displaying the last mentioned characters in advance of the selection of the first mentioned characters, transfer means for successively moving the sheets from said marking mechanism to a predetermined station, mechanism for duplicating the displayed characters upon the sheets transferred to said station and additional transfer mechanism for moving the sheets from said station.

47. In a machine of the class described, a selective marking mechanism for successively applying characters to sheets or the like, said characters being selected to correspond to other predetermined characters to be subsequently applied to the sheets, devices for successively displaying the last mentioned characters in advance of the selection of the first mentioned characters, transfer means for successively moving the sheets from said marking mechanism to a predetermined station, mechanism for duplicating the displayed characters upon the sheets transferred to said station, mechanism for applying characters to the sheets subsequent to the application of the characters at said station and transfer means for moving the sheets from said station into position to be operated upon by the last mentioned character applying mechanism.

48. In a machine of the class described, a marking mechanism for successively applying characters to sheets or the like comprising a plurality of selectively controlled parts for properly positioning the characters for subsequent application to the sheet, means operable to effect application of said characters to the sheet following the selective operations and means for automatically and periodically presenting at a predetermined point other characters individual to those to be selected and in advance of the selective operations whereby to afford an indication of the selections to be made.

49. In a machine of the class described, a marking mechanism for successively applying characters to sheets or the like comprising a plurality of selectively controlled parts for properly positioning the characters for subsequent application to the sheet, means operable to effect application of said characters to the sheet following the selective operations, means for automatically and periodically presenting at a predetermined point different characters individual to those to be selected and in advance of the selective operations whereby to afford an indication of the selection to be made and means for effecting application of said different characters to the sheet.

50. In a machine of the class described, a marking mechanism for applying characters to sheets or the like at a predetermined station comprising a plurality of selectively controlled parts for properly positioning the characters for subsequent application to the sheet, mechanism operable to effect application of said characters to the sheet while at said station following the selective operations, a device for automatically and periodically displaying different characters individual to those to be selected and in advance of the selective operations whereby to afford an indication of the selections to be made, mechanism for effecting application of said different characters to the sheet at a different station, and means for moving the sheet from one of said stations to the other.

51. In a machine of the class described, the combination of two marking mechanisms for applying characters to sheets or the like, one of said mechanisms having a plurality of different characters to be applied successively to different sheets, said characters being individual to certain characters of the other marking mechanism, said last mentioned marking mechanism including selectively operable parts whereby to permit selection of the characters corresponding to those individual thereto, a transfer mechanism for advancing the sheets from the first marking mechanism operating thereon to the second, and means for operating said marking mechanisms and said transfer mechanism in proper timed relation.

52. In a machine of the class described, the combination of two marking mechanisms for applying characters to sheets or the like, one of said mechanisms having a plurality of different characters to be applied successively to different sheets, said characters being individual to certain characters of the other marking mechanism, said last mentioned marking mechanism including selectively operable parts whereby to permit selection of the characters corresponding to those individual thereto, an actuating device for each of said marking mechanisms, a driving unit adapted to be coupled with said actuating devices when the selection has been made, said actuating devices being arranged to operate said marking mechanisms one in advance of another, and means operated by the driving unit arranged to advance the sheet from the first marking mechanism operating thereon to the second.

53. In a machine of the class described, the combination of a character applying mechanism having a plurality of selective characters with selectively operable elements for arranging the characters to correspond to other predetermined characters individual thereto, devices for successively displaying the last mentioned characters in advance of the selection of the first mentioned characters whereby to afford an indication of the selections to be made, mechanism arranged to cooperate with the sheet and said first and second mentioned characters to effect application of said characters to the sheet subsequent to the selective and display operations, and means for operating said devices and said mechanisms in proper timed relation.

54. In a machine of the class described, the combination of two marking mechanisms for applying characters to sheets or the like, one of said mechanisms having a plurality of different characters to be applied successively to different sheets, said characters being individual to certain characters of the other marking mechanism, said last mentioned marking mechanism being arranged to apply the characters thereof while the sheet is at rest and including selectively operable parts whereby to permit selection of the characters corresponding to those individual thereto, actuating devices for said marking mechanisms, a transfer device for moving the sheet from one marking mechanism to another, and a driving unit for actuating said transfer device and said actuating devices in proper timed relation, said driving unit being arranged to automatically discontinue operation of one of said actuating devices following a complete operation of the marking mechanism actuated thereby.

55. In a machine of the class described, a selective character applying mechanism for successively applying characters to sheets or the like, said characters being selected to correspond to other predetermined characters individual thereto, devices for successively displaying the last mentioned characters in advance of the selection of the first mentioned characters whereby to afford an indication of the selections to be made, a second mechanism for effecting application of said predetermined characters to the sheet, mechanism for applying additional characters to the sheet individual to those to be applied by one of said character applying mechanisms, transfer means for advancing the sheet from the first character applying mechanism operating thereon to the remaining character applying mechanisms, and means for operating said character applying mechanisms and said transfer means in proper timed relation.

56. In a machine of the class described, the combination of two character applying mechanisms for placing characters upon sheets or the like, one of said mechanisms having a plurality of selectively controlled characters with manually operable means for making the selections, said selections being made in accordance with different predetermined characters of the other character applying mechanism individual to the characters to be selected, mechanism arranged to cooperate with the sheet and the selected characters and those individual thereto whereby to effect application of said characters to the sheet and operating means for said mechanisms arranged to automatically discontinue operation of the selective character applying mechanism following application of the selected characters to the sheet.

57. In a machine for applying characters to checks and the like, a printing mechanism selectively operable to set up different amounts to be applied to different checks, means for displaying characters for application to the checks individual to the amounts to be applied thereto whereby to afford an indication of the selections to be made, and operating mechanism arranged to cooperate with the checks and with said printing mechanism and the characters individual to said amounts whereby to effect application of said amounts and said characters to the individual checks.

58. In a machine of the class described, a marking mechanism for applying characters to sheets and the like comprising a holder for supporting the sheets during the marking operations, said holder having spaced side walls between which the sheets are positioned, said walls having openings therethrough, a support provided with a series of character holding elements, means for successively moving said elements from the support and positioning them at one side of the holder, and means arranged to operate through said openings and to cooperate with said elements and the sheets while within the holder to duplicate the characters of said elements upon the sheets.

59. In a machine of the class described, a marking mechanism for applying characters to sheets and the like comprising a holder for supporting the sheets during the marking operations, a support provided with a series of character holding elements, means for successively moving said elements from the support and positioning them at one side of the holder, mechanism arranged to simultaneously move and cooperate with said elements and the sheets to duplicate the characters of the elements upon the sheets, and means arranged to move the holder independently of the movement of the sheet by said mechanism and in the direction of movement of the sheet during the marking operations.

60. In a machine of the class described, a marking mechanism for applying characters to sheets and the like comprising a holder for supporting the sheets during the marking operations, a support provided with a series of character holding elements, mechanism for successively moving said elements from the support and positioning them at one side of the holder, mechanism arranged to simultaneously move and cooperate with said elements and sheets to duplicate the characters of the elements upon the sheets, means arranged to move the holder independently of the movement of the sheet by said mechanism and in the direction of the movement of the sheet during the marking operations, devices for conveying the sheets to and from the holder and means for operating said devices and said mechanisms in proper timed relation.

61. In a machine of the class described, the combination of separate marking mechanisms for successively placing characters upon separate sheets at different stations, transfer means for individually moving the sheets from one station to the other including rotary elements mounted between and independently of the marking mechanisms and arranged to receive a portion of the sheet while it is at rest and in position to be operated upon by one of the marking mechanisms, an actuating mechanism for each of said marking mechanisms and means for actuating said mechanisms and said transfer means in proper timed relation.

62. In a machine of the class described, the combination of spaced marking mechanisms for successively placing characters upon separate sheets at different stations, transfer means for individually moving the sheets from one station to the other including rotary elements mounted between the marking mechanisms and arranged to receive a portion of the sheet while it is at rest and being operated upon by one of the marking mechanisms, an actuating mechanism for each of said marking mechanisms and a driving unit for said transfer means and said actuating mechanisms adapted to automatically discontinue operation of the same following each operation of the marking mechanism last to be actuated.

63. In a machine of the class described, the combination of separate marking mechanisms for successively placing characters upon separate sheets at different stations, transfer means for individually moving the sheets from one station to the other including rotary elements mounted between and independently of the marking mechanisms and arranged to receive a portion of the sheet while it is at rest and being operated on by one of said mechanisms, the latter including selective control means whereby to determine the characters to be applied by it to the sheet in advance of movement of the sheet to the next station and actuating means for said transfer means and said marking mechanisms adapted to operate the same in proper timed relation.

64. In a machine of the class described, the combination of separate marking mechanisms for successively placing characters upon separate sheets at different stations, transfer means for individually moving the sheets from one station to the other including rotary elements mounted independently of the marking mechanisms and arranged to engage opposite sides of the sheet to move it from one station to the other, one of said mechanisms including selective control means operable while the sheet is at rest within said mechanism whereby to determine the characters to be applied by it to the sheet and means for actuating said transfer means and said marking mechanisms in proper timed relation.

65. In a machine of the class described, the combination of two adjacent marking mechanisms for successively placing characters upon separate sheets, a transfer mechanism including sheet engaging and advancing parts arranged between said mechanisms and adapted to move the sheets one by one from a position of rest upon the first marking mechanism to apply characters to the sheet to the adjacent marking mechanism, the sheets being manually insertable within said first marking mechanism in position to be received by said parts, and means for actuating said marking and transfer mechanisms in proper timed relation.

WALTER B. PAYNE.